(12) United States Patent
Backes et al.

(10) Patent No.: US 9,545,119 B2
(45) Date of Patent: Jan. 17, 2017

(54) SPECIFIC VANILLYL LIGNANS AND USE THEREOF AS TASTE IMPROVERS

(75) Inventors: Michael Backes, Holzminden (DE); Jakob Peter Ley, Holzminden (DE); Katharina Reichelt, Holzminden (DE); Susanne Paetz, Höxter (DE)

(73) Assignee: SYMRISE AG, Holzminden (DE)

( * ) Notice: Subject to any disclaimer, the term of this patent is extended or adjusted under 35 U.S.C. 154(b) by 262 days.

(21) Appl. No.: 14/114,189

(22) PCT Filed: Apr. 24, 2012

(86) PCT No.: PCT/EP2012/057491
§ 371 (c)(1),
(2), (4) Date: Oct. 25, 2013

(87) PCT Pub. No.: WO2012/146584
PCT Pub. Date: Nov. 1, 2012

(65) Prior Publication Data
US 2014/0050835 A1    Feb. 20, 2014

Related U.S. Application Data
(60) Provisional application No. 61/480,636, filed on Apr. 29, 2011.

(30) Foreign Application Priority Data
Apr. 29, 2011 (EP) ..................... 11164373

(51) Int. Cl.
A23L 1/22 (2006.01)

(52) U.S. Cl.
CPC ............ A23L 1/22075 (2013.01); A23L 27/10 (2016.08); A23L 27/84 (2016.08); A23L 27/86 (2016.08)

(58) Field of Classification Search
CPC ........... A23L 27/10; A23L 27/86; A23L 27/84
USPC ................. 426/534, 536, 650, 655
See application file for complete search history.

(56) References Cited

U.S. PATENT DOCUMENTS

| | | | |
|---|---|---|---|
| 6,451,849 B1 | 9/2002 | Ahotupa et al. | |
| 2002/0061854 A1 | 5/2002 | Ahotupa | |
| 2004/0048804 A1 | 3/2004 | Ahotupa | |
| 2008/0227867 A1* | 9/2008 | Ley et al. | 514/685 |
| 2010/0129302 A1 | 5/2010 | Ahlnas | |

FOREIGN PATENT DOCUMENTS

| | | |
|---|---|---|
| EP | 1258200 A2 | 11/2002 |
| EP | 1377182 A1 | 1/2004 |
| EP | 1955601 A1 | 8/2008 |
| EP | 1989944 A1 | 11/2008 |
| EP | 2008530 A1 | 12/2008 |
| EP | 2064959 A1 | 6/2009 |
| EP | 2135516 A1 | 12/2009 |
| EP | 2298084 A1 | 3/2011 |
| JP | 2003063971 A | 3/2003 |
| JP | 2010057367 A | 3/2010 |
| WO | 02080702 A1 | 10/2002 |
| WO | 2004020474 A1 | 3/2004 |
| WO | 2004078302 A1 | 9/2004 |
| WO | 2005096841 A1 | 10/2005 |
| WO | 2006024587 A1 | 3/2006 |
| WO | 2006058893 A2 | 6/2006 |
| WO | 2006106023 A1 | 10/2006 |
| WO | 2007003527 A1 | 1/2007 |
| WO | 2007014879 A1 | 2/2007 |
| WO | 2007107596 A1 | 9/2007 |
| WO | 2008046895 A1 | 4/2008 |

OTHER PUBLICATIONS

European Office Action issued in European Application No. 11 164 373.0 on Aug. 12, 2014.
European International Search Report and Written Opinion dated Nov. 29, 2012 for priority application PCT/EP2012/057491.
Database WPI/Thomson, vol. 2010, Nr. 22, AN 2010-D15543 [22], XP002667324, Sep. 1, 2008.
Milder, et al, Lignan contents of Dutch plant foods: a database including lariciresinol, pinoresinol, secoisolariciresinol and matairesinol, British Journal of Nutrition, vol. 93, Nr. 3, pp. 393-402, Mar. 1, 2005.
International Search Report mailed Nov. 29, 2012 for priority application PCT/EP2012/057491.

* cited by examiner

Primary Examiner — Leslie Wong
(74) Attorney, Agent, or Firm — Polsinelli PC

(57) ABSTRACT

The invention relates to the use of specific compounds from the structural class of vanillyl lignans or the salts and/or mixtures thereof for modifying or masking unpleasant taste impressions, in particular bitter, astringent, and/or metallic taste impressions. The invention also relates to a corresponding method for masking unpleasant taste impressions, in particular bitter, astringent, and/or metallic taste impressions. The invention further relates to specific preparations containing an effective amount of vanillyl lignans or the salts and/or mixtures thereof to be used in accordance with the invention.

20 Claims, No Drawings

SPECIFIC VANILLYL LIGNANS AND USE THEREOF AS TASTE IMPROVERS

The invention relates to the use of specific compounds from the structural class of vanillyl lignans or the salts and/or mixtures thereof for modifying or masking unpleasant taste impressions, in particular bitter, astringent and/or metallic taste impressions. The invention also relates to a corresponding method for masking unpleasant taste impressions, in particular bitter, astringent and/or metallic taste impressions. The invention further relates to specific preparations containing an effective amount of vanillyl lignans or the salts and/or mixtures thereof to be used according to the invention.

Food products and semiluxury food products often contain a plurality of different bitter substances which, although being desirable in particular foods within limits and contribute to the characteristic flavours of such foods (e.g. caffeine in tea or coffee, quinine in "Bitter Lemon" drinks, bitter substances from hops in beer), these substances can also severely reduce the value of these food products (e.g. flavonoid glycosides and limonoids in citrus juices, the bitter aftertaste of many high intensity sweeteners such as aspartame, cyclamate, acesulfame K, rebaudioside A, glycyrrhizinic acid or saccharin, hydrophobic amino acids and/or peptides in cheese).

The bitter flavour is often caused by individual substances (examples are given below) which bind to special bitter taste receptors on taste cells (which are found in the taste buds on the tongue) and send a signal to the brain, via neurochemical cascades, that initiates a defensive reaction and a negative taste impression (see Wolfgang Meyerhof, Reviews of Physiology, Biochemistry and Pharmacology 2005, 154, 37-72).

An astringent taste is usually caused by the precipitation of proline-rich proteins in the saliva by astringent substances, for example, metal salts, polyphenols such as (gallo)catechins, proanthocyanidins, other flavonoids or tannins. The normally homogeneous saliva which serves as a lubricant, then contains denatured proteins which reduce the slipperiness and thus result in a rough or dry sensation, also known as an astringent feeling, in the mouth (Am. J. Clin. Nutr. 2005, 81, 330S-335S).

In order to reduce the content of bitter substances in foods, being either already contained in the starting material, for example, in citrus fruits, or which arise during the manufacturing process, for example, during cheese-making, subsequent treatment is often required. Said treatment can take place extractively, as in the case of the decaffeination of tea or coffee, or enzymatically, for example, by treating orange juice with a glycosidase to destroy the bitter naringin or by splitting gallic acid esters of catechins into free catechins with esterases, or the use of special peptidases during the ripening of cheese. This treatment is detrimental for the product, generates waste substances and gives rise to solvent residues and other residues (e.g. enzymes) in the products.

It is therefore desirable that substances should be found which can effectively suppress or at least reduce unpleasant taste impressions, in particular bitter, astringent and/or metallic taste impressions without influencing the quality of the food by additional processing steps.

With many pharmaceutical active ingredients, the suppression of the bitter taste is particularly important. By this means, the readiness of patients to take pharmaceutical preparations orally, particularly bitterness-sensitive patients such as children, can be significantly improved. Many pharmaceutical active ingredients, for example, aspirin, salicin, paracetamol, ambroxol, antibiotics such as oxafloxazin or quinine, as well as a whole series of further pharmaceutically active compounds, have a marked bitter, astringent and/or metallic taste and/or aftertaste.

A variety of non-nutritive, highly intense sweeteners also often cause taste problems. Thus, although such substances are highly suitable, due to the low usage concentrations thereof, for imparting sweetness to foods, the time-intensity profiles (e.g. of sucralose, stevioside, cyclamate) which are unlike that of sugar often result in taste problems, a bitter and/or astringent after-taste (e.g. acesulfame K, saccharin, stevioside, rebaudioside A, rebaudioside C) and/or marked additional aromatic impressions (e.g. the ammonium salt of glycyrrhizinic acid). Particularly with sweet, calorie-free or almost calorie-free foods, for example, beverages which are made with the aid of such sweeteners, this unpleasant auxiliary taste and/or after-taste often reduces the sensory acceptability and should therefore be masked.

Some initiatives for the, at least partial, reduction in bitterness (e.g. in Chemosensory Perception 2008, 1(1):58-77) have been described: firstly, the removal of the bitter substance from the food, for example, the debittering of citrus juices, the use of encapsulation systems or the masking of bitter flavoured compounds with the aid of other flavouring or aromatic substances, such as sweeteners (Recent Patents on Drug Delivery and Formulation, 2009, 3, 26-39). However, the initiatives described all have limitations in use, and some have severe limitations such as a lack of naturalness, costly raw materials, side-effects (e.g. simultaneous suppression of sweetness, additional salty flavour, etc.) and/or solubility problems, so that a need remains for natural, simple-to-use masking, and particularly bitterness-masking, substances.

It is the primary object of the present invention to find substances (or mixtures of substances) which enable the partial, extensive or complete reduction of unpleasant taste impressions, in particular bitter, astringent and/or metallic taste impressions from unpleasant tasting substances.

Said substances should preferably have a bitterness-masking effect, preferably against a plurality of bitter substances that occur, in particular, in foods and semiluxury food products, as well as pharmaceutical agents, but preferably without influencing the otherwise desirable taste impression of such products.

The substances being sought should also have broad usage possibilities. Furthermore, the substances being sought should preferably be as readily accessible as possible.

This object is achieved according to the invention by the use of one, two or more vanillyl lignans selected from the group consisting of (1) Matairesinol (3,4-bis[(4-hydroxy-3-methoxyphenyl)methyl]oxolan-2-one);

(2) 7-hydroxymatairesinol (4-[hydroxy-(4-hydroxy-3-methoxyphenyl)methyl]-3-[(4-hydroxy-3-methoxyphenyl)methyl]oxolan-2-one); (also called "hydroxymatairesinol" below);

(3) Lariciresinol (4-[[5-(4-hydroxy-3-methoxyphenyl)-4-(hydroxymethyl)-oxolan-3-yl]methyl]-2-methoxyphenol);

(4) Arctigenin (4-[(3,4-dimethoxyphenyl)methyl]-3-[(4-hydroxy-3-methoxyphenyl)methyl]oxolan-2-one);
(5) Isolariciresinol (1,2,3,4-tetrahydro-7-hydroxy-1-(4-hydroxy-3-methoxyphenyl)-6-methoxy-2,3-naphthalenedimethanol);
(6) α-conidendrin (7-hydroxy-9-(4-hydroxy-3-methoxyphenyl)-6-methoxy-3a,4,9,9a-tetrahydro-1H-benzo[f][2]benzofuran-3-one);
(7) Nortrachelogenin (3-hydroxy-3,4-bis[(4-hydroxy-3-methoxyphenyl)methyl]-oxolan-2-one);
(8) Pinoresinol (4-[6-(4-hydroxy-3-methoxyphenyl)-1,3,3a,4,6,6a-hexahydrofuro[3,4-c]furan-3-yl]-2-methoxyphenol);
(9) 5-hydroxylariciresinol (3,5-bis[(4-hydroxy-3-methoxyphenyl)methyl]-4-(hydroxylmethyl)tetrahydrofuran-2-ol);
(10) 2-hydroxyarctigenin (4-[(3,4-dimethoxyphenyl)-hydroxy-methyl]-3-[(4-hydroxy-3-methoxyphenyl)methyl]tetrahydrofuran-2-one);
(11) Trachelogenin (3-hydroxy-3,4-bis[(4-hydroxy-3-methoxy-phenyl)methyl]tetrahydrofuran-2-one);
(12) Thujastandin (3,4-dihydroxy-3,4-bis[(4-hydroxy-3-methoxy-phenyl)methyl]tetrahydrofuran-2-one);
(13) Busaliol (4-[[hydroxy-[4-(4-hydroxy-3-phenyl)methyl]-tetrahydrofuran-3-yl]-methyl]-2,6-dimethoxyphenol);
(14) Shonanin (4-[[hydroxy-(4-hydroxy-3-methoxyphenyl)methyl]tetrahydrofuran-3-yl]methyl]-2-methoxyphenol);
(15) Liovil (4-[hydroxy-[4-[hydroxy-(4-hydroxy-3-methoxyphenyl)methyl]tetrahydrofuran-3-yl]methyl]-2-methoxyphenol);
(16) Isoliovil (Todolactol A) (4-[hydroxy-(4-hydroxy-3-methoxyphenyl)methyl)-3-[4-hydroxy-3-methoxyphenyl)methyl]tetrahydrofuran-2-ol);
(17) Koreanol (4-[[4-[hydroxy-(4-hydroxy-3-methoxyphenyl)methyl]-2-methoxy-tetrahydrofuran-3-yl]methyl]-2-methoxyphenol);
(18) Taxiresinol (4-[4-[(4-hydroxy-3-methoxyphenyl)methyl]-3-(hydroxymethyl)tetrahydrofuran-2-yl]benzene-1,2-diol);
(19) Phillygenol (4-[6-(3,4-dimethoxyphenyl)-1,3,3a,4,6,6a-hexahydrofuro[3,4-c]furan-3-yl]2-methoxyphenol);
(20) Guaiaretic acid (4-[E-4-(4-hydroxy-3-methoxyphenyl)-2,3-dimethyl-but-3-enyl]-2-methoxyphenol);
(21) Gnidifolin (3-[(2,4-dihydroxy-3-methoxyphenyl)methyl]-4-[(4-hydroxy-3-methoxy-phenyl)methyl]tetrahydrofuran-2-one);
(22) Fragransin A$_2$ (4-[5-(4-hydroxy-3-methoxyphenyl)-3,4-dimethyl-tetrahydrofuran-2-yl]-2-methoxyphenol);
(23) Fragransin C$_{3b}$ (4-[5-(4-hydroxy-3-methoxyphenyl)-3,4-dimethyl-tetrahydrofuran-2-yl]-2,6-dimethoxyphenol);
(24) Astralignin (4-[5-(3,4-dimethoxyphenyl)-3,4-dimethyl-tetrahydrofuran-2-yl]-2-methoxyphenol);
(25) Massoniresinol (2-(4-hydroxy-3-methoxyphenyl)-4-[(4-hydroxy-3-methoxy-phenyl)methyl]-3-(hydroxymethyl)tetrahydrofuran-3,4-diol);
(26) Olivil (5-(4-hydroxy-3-methoxyphenyl)-3-[(4-hydroxy-3-methoxyphenyl)methyl]-4-(hydroxymethyl)tetrahydrofuran-3-ol);
(27) Isoolivil (Cycloolivil) (4-(4-hydroxy-3-methoxyphenyl)-2,3-bis(hydroxymethyl)-7-methoxy-tetralin-2,6-diol);
(28) Neo-Olivil (4-[5-(4-hydroxy-3-methoxphenyl)-3,4-bis(hydroxymethyl)-tetrahydrofuran-2-yl]-2-methoxyphenol);
(29) Vitedoin (6-hydroxy-4-(4-hydroxy-3-methoxyphenyl)-3-(hydroxymethyl)-5-methoxy-3,4-dihydronaphthalene-2-carbaldehyde); and
(30) Vitrofolal E (6-hydroxy-4-(4-hydroxy-3-methoxyphenyl)-7-methoxynaphthalene-2-carbaldehyde).

or one, two or more different salts of one, two or more different vanillyl lignans selected from the group as defined above or a mixture of one, two or more different vanillyl lignans selected from the group as defined above having one, two or more different salts of one, two or more different vanillyl lignans selected from the group as defined above for modifying the sensation or masking the unpleasant taste impression, preferably the bitter, astringent and/or metallic taste impression, of an unpleasant tasting substance, preferably of a bitter substance.

It was unexpectedly found that the vanillyl lignans to be used according to the invention, mixtures thereof and/or salts thereof are capable of masking, that is, reducing or even entirely suppressing, unpleasant, in particular bitter, astringent and/or metallic taste impressions of a large number of unpleasant-tasting substances and preparations for oral consumption which contain one or more unpleasant, in particular bitter, astringent and/or metallic tasting substances. This applies similarly to the inventive preparations described below.

In the context of the present text, masking denotes a reduction, that is, lessening or complete suppression.

The modification or masking of an unpleasant taste impression therefore often means, in effect, an improvement in taste, particularly in relation to bitter, astringent and/or metallic taste impressions.

The structures of the compounds (1) to (30) to be used according to the invention are shown below for the sake of clarity:

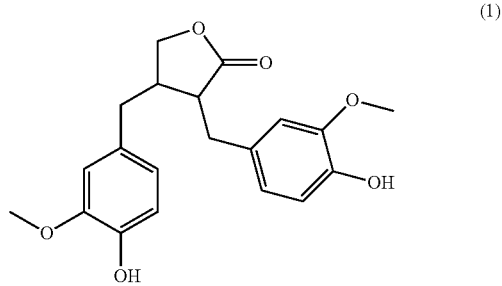

(1)

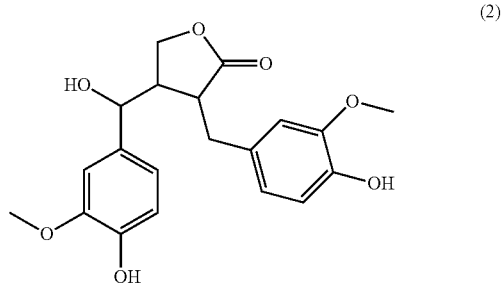

(2)

(3)
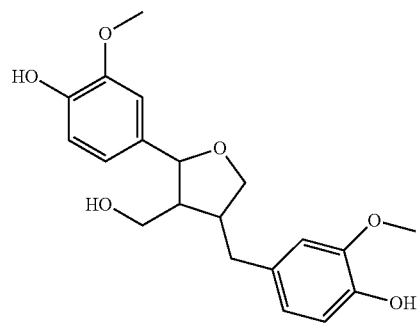
(4)
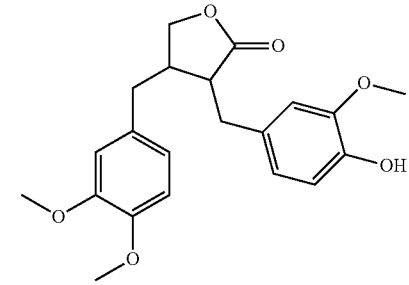
(5)
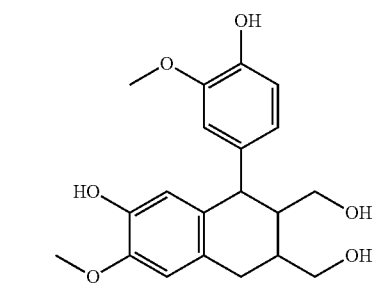
(6)
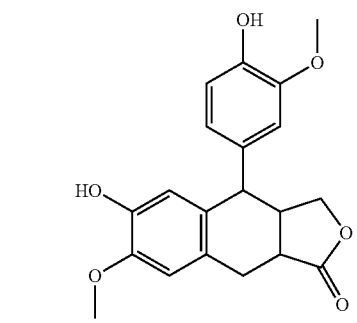
(7)
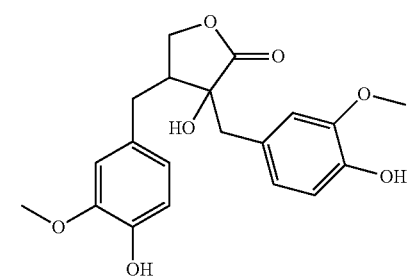
(8)
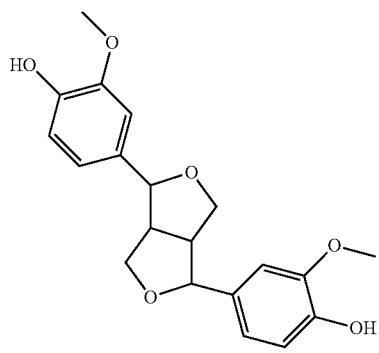
(9)
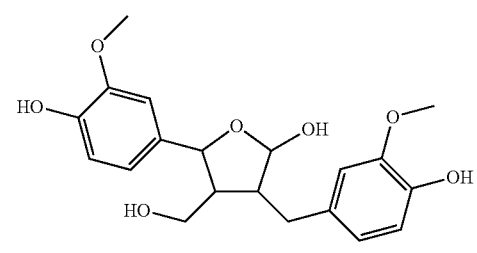
(10)
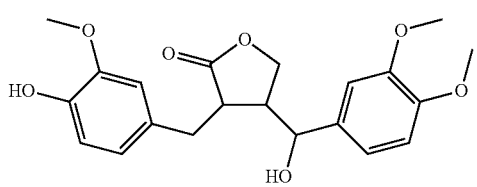
(11)
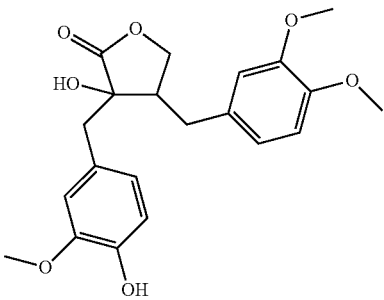
(12)
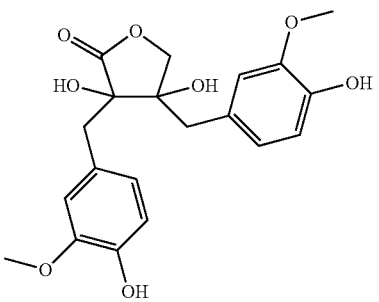
(13)
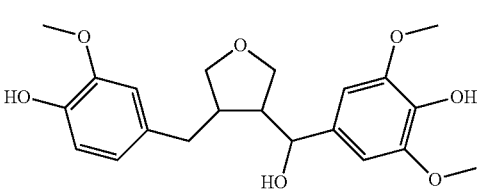

(14) 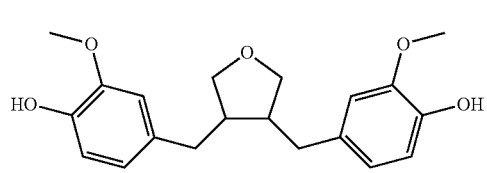
(15) 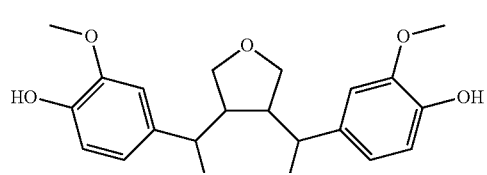
(16) 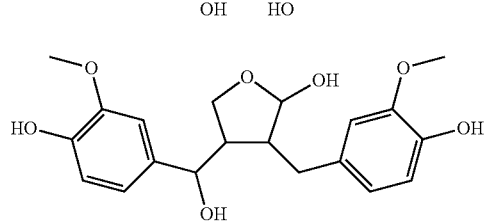
(17) 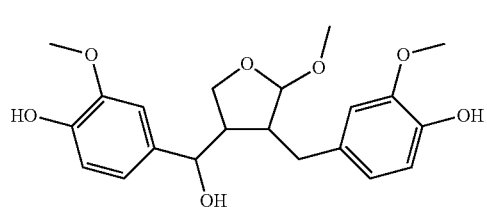
(18) 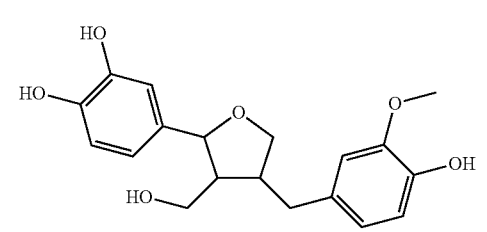
(19) 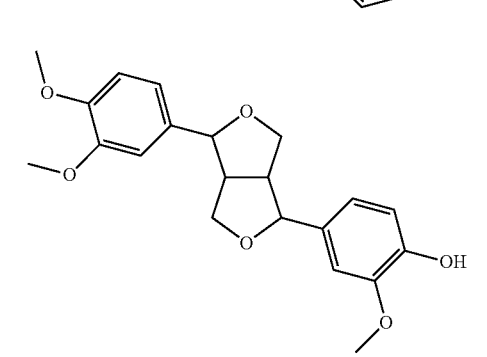
(20) 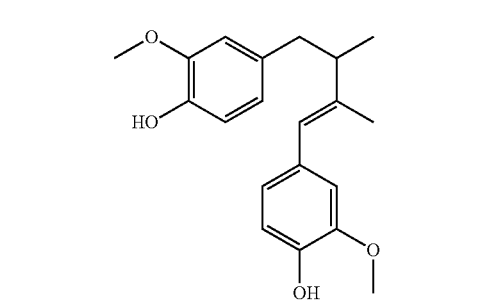
(21) 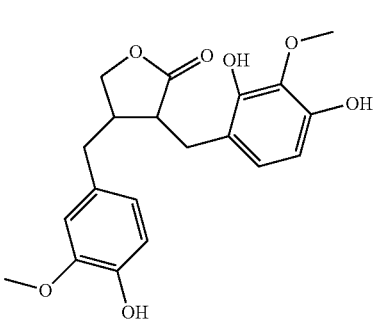
(22) 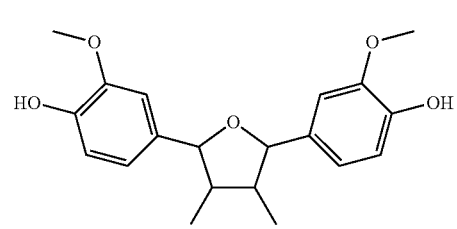
(23) 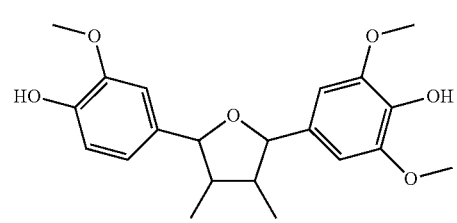
(24) 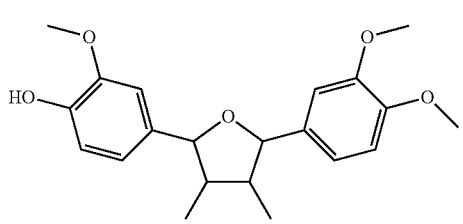
(25) 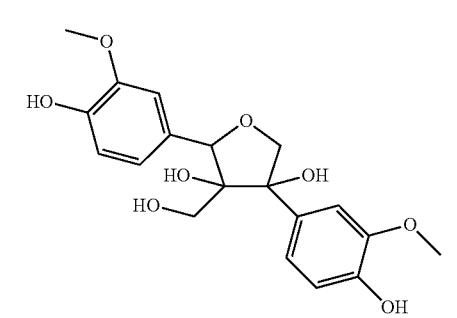
(26) 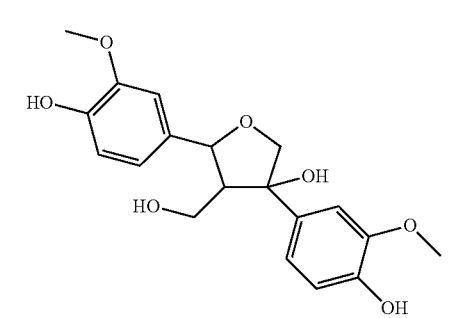

-continued

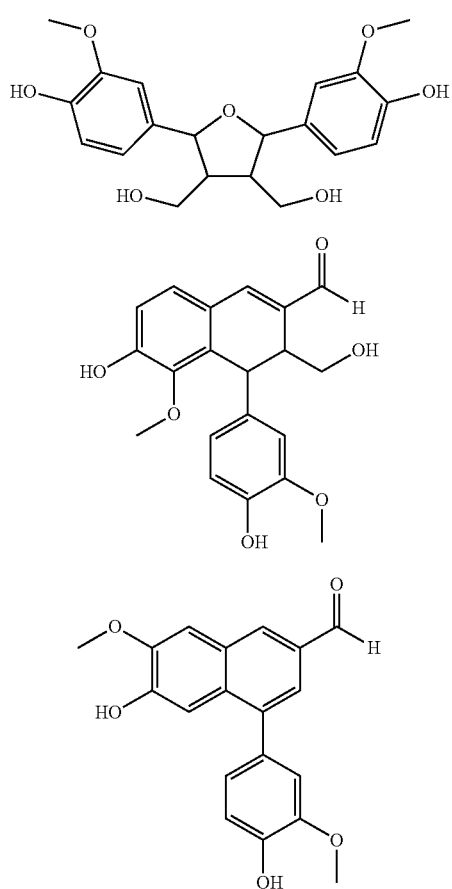

In the context of the present text, should any contradiction arise between the chemical name and the corresponding structural formula, the relevant structural formula shall apply.

Particularly advantageous and therefore preferable in the context of the present application is a use as described above wherein one, two or more, or all of the vanillyl lignans used are each selected from the group consisting of
(1) Matairesinol (3,4-bis[(4-hydroxy-3-methoxyphenyl)methyl]oxolan-2-one);
(2) 7-hydroxymatairesinol (4-[hydroxy-(4-hydroxy-3-methoxyphenyl)methyl]-3-[(4-hydroxy-3-methoxyphenyl)methyl]oxolan-2-one);
(3) Lariciresinol (4-[[5-(4-hydroxy-3-methoxyphenyl)-4-(hydroxymethyl)-oxolan-3-yl]methyl]-2-methoxyphenol);
(4) Arctigenin (4-[(3,4-dimethoxyphenyl)methyl]-3-[(4-hydroxy-3-methoxy-phenyl)methyl]oxolan-2-one);
(5) Isolariciresinol (1,2,3,4-tetrahydro-7-hydroxy-1-(4-hydroxy-3-methoxyphenyl)-6-methoxy-2,3-naphthalenedimethanol);
(6) α-conidendrin (7-hydroxy-9-(4-hydroxy-3-methoxyphenyl)-6-methoxy-3a,4,9,9a-tetrahydro-1H-benzo[f][2]benzofuran-3-one);
(7) Nortrachelogenin (3-hydroxy-3,4-bis[(4-hydroxy-3-methoxyphenyl)methyl]-oxolan-2-one);
(8) Pinoresinol (4-[6-(4-hydroxy-3-methoxyphenyl)-1,3,3a,4,6,6a-hexahydrofuro[3,4-c]furan-3-yl]-2-methoxyphenol);
and salts thereof.

Particularly preferable is the use of the naturally occurring stereoisomers of the vanillyl lignans, or mixtures thereof to be used according to the invention, wherein the stereoisomer purity is greater than 50%, preferably >80%, particularly preferably >90%, relative to all the stereoisomers of the respective vanillyl lignan(s).

Particularly preferable is a use as described above wherein one, two or more, or all of the vanillyl lignans used are each selected from the group consisting of
(1-(−)) (−)-matairesinol ((3R,4R)-3,4-bis[(4-hydroxy-3-methoxyphenyl)methyl]oxolan-2-one);
(2-(−)) (−)-7-hydroxymatairesinol ((3R,4R)-4-[(S)-hydroxy-(4-hydroxy-3-methoxy-phenyl)methyl]-3-[(4-hydroxy-3-methoxyphenyl)methyl]oxolan-2-one);
(3-(+)) (+)-lariciresinol (4-[[(3R,4R,5S)-5-(4-hydroxy-3-methoxyphenyl)-4-(hydroxy-methyl)-oxolan-3-yl]methyl]-2-methoxyphenol);
(4-(−)) (−)-arctigenin ((3R,4R)-4-[(3,4-dimethoxyphenyl)methyl]-3-[(4-hydroxy-3-methoxy-phenyl)methyl]oxolan-2-one);
(5-(+)) (+)-isolariciresinol (1,2,3,4-tetrahydro-7-hydroxy-1-(4-hydroxy-3-methoxy-phenyl)-6-methoxy-2,3-naphthalenedimethanol);
(6-(−)) (−)-α-conidendrin ((3aR,9R,9aS)-7-hydroxy-9-(4-hydroxy-3-methoxyphenyl)-6-methoxy-3a,4,9,9a-tetrahydro-1H-benzo[f][2]benzofuran-3-one);
(7-(−)) (−)-nortrachelogenin ((3S,4S)-3-hydroxy-3,4-bis[(4-hydroxy-3-methoxyphenyl)methyl]-oxolan-2-one);
(8-(+)) (+)-pinoresinol (4-[(3S,3aR,6S,6aR)-6-(4-hydroxy-3-methoxyphenyl)-1,3,3a,4,6,6a-hexahydrofuro[3,4-c]furan-3-yl]-2-methoxyphenol),
and salts thereof.

The structures of the compounds (1-(−)) to (8-(+)) given above are shown below for the sake of clarity:

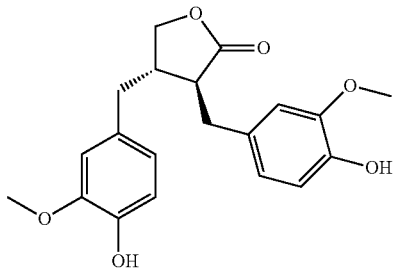

(1-(−))

(2-(-))
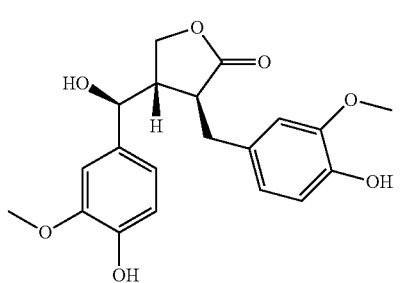

(3-(+))
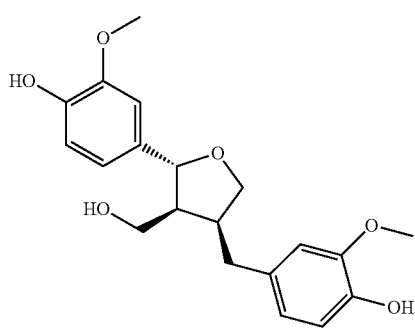

(4-(-))
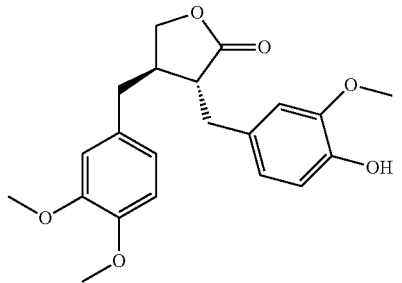

(5-(+))
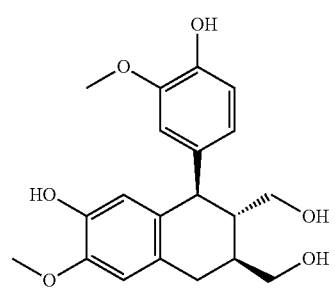

(6-(-))
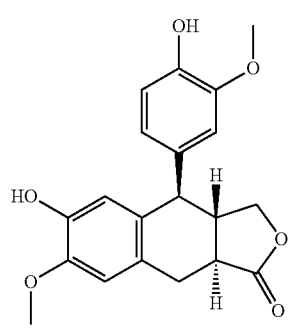

(7-(-))
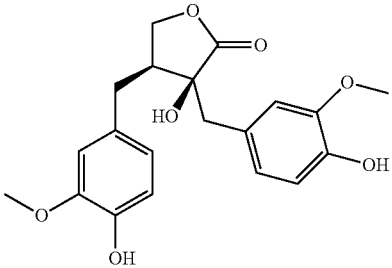

(8-(+))
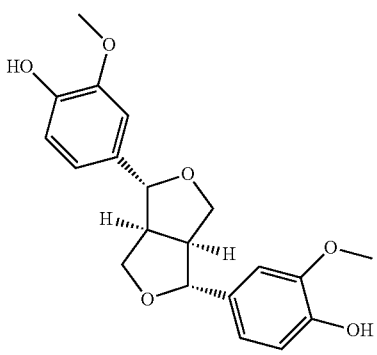

According to the invention, most preferable are matairesinol (compound 1), 7-hydroxymatairesinol (compound 2), lariciresinol (compound 3) and α-conidendrin (compound 6) wherein said compounds are each present as racemic mixtures or are preferably each present in a proportion of greater than 50%, preferably greater than 80%, particularly preferably greater than 90% of 1-(−), 2-(−), 3-(+) or 6-(−), relative, in each case, to all the stereoisomers of the compounds (1), (2), (3) or (6).

Where preferable or particularly preferable compounds are given in the context of the present text, naturally the physiologically acceptable, and preferably edible, salts of such compounds are also (particularly) preferably to be used according to the invention. The vanillyl lignans to be used according to the invention can preferably be present as monovalent, or in the case of hydroxy groups, as polyvalent anions, wherein the simple positively charged cations of the first main group and subgroup, the ammonium ion, a trialkylammonium ion, the trivalently charged cations of the second subgroup and the trivalent cations of the 3rd main group or subgroup can serve as the counter-cation, preferably $Na^+$, $K^+$, $NH_4^+$, $Ca^{2+}$, $Mg^{2+}$, $Al^{3+}$ and $Zn^{2+}$.

It is therefore preferred, according to the invention, to use one, two or more different salts of one, two or more different vanillyl lignans as defined above
or
a mixture of one, two or more different vanillyl lignans as defined above having one, two or more different salts of one, two or more different vanillyl lignans selected as defined above,
wherein the counter-cation(s) of the or one, a plurality, or all of the salts is/are preferably selected from the group consisting of $Na^+$, $K^+$, $NH_4^+$, $Ca^{2+}$, $Mg^{2+}$, $Al^{3+}$ and $Zn^{2+}$.

Lignans are defined as a class of phenolic compounds which have a 2,3-dibenzylbutane skeleton. Lignans are formed through the linking of monomer units, for example, cinnamic acid, caffeic acid, ferulic acid, coumaric acid or gallic acid. In nature, these compounds are found in a large number of plants. Said compounds can be found in various plant parts, for example, roots, leaves, branches, seeds or fruits, although often only in very low concentrations.

In the natural sources, lignans are often not present in the free form, but in a glycosidic form in conjunction with fibrous constituents occurring in the plants. In order to quantify the lignans occurring in foods, the material is therefore enzymatically or chemically hydrolysed before analysis (e.g. Br. J. Nutr., 1998, 79, 37-45; 2005, 93, 393-402; J. Agric. Food Chem., 2007, 55, 1337-1346; 2008, 56, 7311-7315). The largest concentrations of glycosidcally bonded lignans are found in oilseeds and nuts as well as cereal products, above all whole grain products, but also, in smaller quantities in fruit and vegetables (Br. J. Nutr., 2005, 93, 393-402; J. Agric. Food Chem., 2007, 55, 1337-1346; 2008, 56, 7311-7315).

Alongside food plants, various conifer trees also contain large quantities of lignans (J. Agric. Food Chem., 2003, 51, 7600-7606). The compounds specified above to be used according to the invention belonging to the group of vanillyl lignans also appear in a variety of natural sources, including a variety of food plants. Natural sources include, inter alia, *Linum* sp., *Sesamum indicum, Secale cereale, Triticum* ssp., *Brassica* sp., *Capsicum* sp., *Abies* sp., *Picea* sp., *Pinus* sp. and *Larix* sp. (e.g. J. Agric. Food Chem., 2003, 51, 7600-7606; 2007, 55, 1337-1346; Br. J. Nutr., 2005, 93, 393-402).

An overview of the various vanillyl lignans appearing in nature can be found, inter alia, in Nat. Prod. Rep., 1985, 2, 191-211; 1987, 4, 499-525; 1990, 7, 349-364; 1995, 12, 183-205; 2005, 22, 696-716.

The synthesis of the compounds to be used according to the invention is described, for example, in Org. Lett., 2003, 5 (4), 491-493, J. Chem. Soc., Perkin Trans. 2002, 1, 1906-1910, Org. Lett., 2004, 6 (9), 1345-1348 and Steroids, 2001, 66 (10), 777-784.

In the natural sources, the vanillyl lignans are usually present in a bonded form (e.g. glycosidically bonded or bonded to insoluble matrix constituents). In addition, the lignans are often present in foods (with the exception of flax and sesame) in only small concentrations, usually together with other lignans in a total quantity of not more than 30 mg per 1 kg of fresh material (J. Agric Food Chem. 2010, 58, 4959-4969, Br. J. Nutr., 2005, 93, 393-402). In certain oilseeds such as sesame seeds or linseed, the vanillyl lignans to be used according to the invention are present in relatively high concentrations in the range of 300 to 3000 mg/kg (J. Agric Food Chem. 2010, 58, 4959-4969), but always accompanied by the predominating secoisolariciresinol (Br. J. Nutr., 2005, 93, 393-402), which is present in concentrations in which said compound is perceived to be bitter.

The concentration of free, that is, not glycosidically bonded, vanillyl lignans that are present in natural sources and are to be used according to the invention—provided said lignans are available at all in the free form—is not sufficient in order also to be able to cause perceptible masking effects on bitter substances possibly also contained in the same foodstuffs.

Examples of foods which, in addition to bitter substances, also contain lignans, though not in effective concentrations, are citrus fruits, in particular grapefruit, as well as tea and cocoa. The measured lignan content of grapefruit (lariciresinol, pinoresinol, matairesinol and secoisolariciresinol) is approximately 1500 µg/kg (1.5 ppm); the lignan content of oranges is approximately 800 µg/kg (0.8 ppm) (Br. J. Nutr., 2005, 93, 393-402). The content of the bitter substance naringin as given in the literature for grapefruit is in the range of 200 to 300 mg/100 g of fresh weight (J. Agric. Food Chem., 2005, 53, 3980-3985). In this concentration, naringin makes a marked contribution to the bitterness of grapefruit. In cocoa, a lignan content of 600 µg/kg (0.6 ppm) has been described (Br. J. Nutr., 2005, 93, 393-402). The concentration of the bitter substance theobromine in cocoa is markedly greater at 11450 mg/kg, the caffeine content being approximately 1010 mg/kg. In these concentrations, both substances make a contribution to the bitter flavour of roasted cocoa beans (J. Agric. Food Chem., 2006, 54, 5530-5539). In black tea and in green tea, lignans (secoisolariciresinol and matairesinol) are present in concentrations in the range of 15 mg/kg to 20 mg/kg. The overwhelming proportion of lignans present in tea is due to secoisolariciresinol (Br. J. Nutr., 1998, 79, 37-45) which however, as will be shown below, does not act to mask bitterness, but rather amplifies the bitterness (see example 1). The content of different catechins and caffeine, all of which contribute to the bitter flavour of tea, is in the range of 200 to 2000 mg/kg (total content of catechins), or approximately 75 to 900 mg/kg (caffeine) (J. Agric. Food Chem. 2003, 51, 4427-4435).

The examples given make clear that the naturally occurring content of lignans in these cases is not sufficient to influence positively or to mask the bitter effect of the foods in question. In addition, the lignans which are described in the literature as bitter (Chem. Berichte, 1957, 90, 2857-2869; Acta Pharm., 2010, 60, 119-128) and are often found together with the lignans used according to the invention, lead in higher concentrations, to an unpleasant bitter by-flavour in a foodstuff. A typical example is linseed which, compared with the matairesinol lignans used according to the invention, contains high concentrations of secoisolariciresinol which is not intended to be used according to the invention. Secoisolariciresinol is also capable of amplifying bitter taste impressions (see Example 1 below).

A large number of health-promoting effects have also been described for lignans. Extracts from linseed containing large amounts of lignans, in particular secoisolariciresinol diglucoside (SDG), are used in nutritional supplements, nutraceuticals, nutracosmetics/cosmeceuticals and functional foods and drinks. Purified extracts from, for example, fir wood (*Picea abies*), which contain large quantities of hydroxymatairesinol are also used for this purpose. These extracts are not preparations within the meaning of the present invention, and in particular are not among the preparations serving for nutrition, oral care or semiluxury items within the meaning of the present invention.

U.S. Pat. No. 6,451,849 B1, U.S. Pat. No. 6,689,809 B2 and U.S. Pat. No. 7,005,447 B2 disclose, inter alia, the use of lignans, and in particular hydroxymatairesinol, in functional foodstuffs, nutritional supplements or pharmaceutical preparations for the prevention of a series of cancers, hormone-mediated diseases and cardiovascular diseases. The concentrations described therein are in the range from 1 mg to 20 mg hydroxymatairesinol per 100 g of food material. EP 1 377 182 B1 discloses the use of particular lignans, most particularly from linseed, in particular secoisolariciresinol and matairesinol, for manufacturing foodstuffs with inflammation-inhibiting or anti-ageing effects.

The above-mentioned publications do not contain any indication that the vanillyl lignans, mixtures and/or salts thereof to be used according to the invention have taste-modifying properties, in particular masking properties in relation to an unpleasant taste impression, in particular in relation to bitter, astringent and/or metallic taste impressions. Rather, it is described in the literature that, in particular, hydroxymatairesinol as a pure substance has a strongly bitter flavour (Chem. Berichte, 1957, 90, 2857-

2869). The vanillyl lignans arctigenin, trachelogenin and nortracheloside are described as bitter (Acta Pharm., 2010, 60, 119-128).

Extraction or manufacturing of some of the particularly preferred vanillyl lignans to be used according to the invention is described in greater detail below.

Compound (1-(–)), matairesinol ((3R,4R)-3,4-bis[(4-hydroxy-3-methoxyphenyl)methyl]oxolan-2-one), is contained in a large number of different seeds, cereals, vegetables and fruits, and has also been identified in tea, coffee and wine (Br. J. Nutr. 1998, 79, 37-45; 2005, 93, 393-402). Linseed (*Linum usitatissimum*), for example, is one of the best food sources of lignans (J. Agric. Food Chem. 2001, 49, 3178-3186). Among the cereals, rye has a high concentration of the plant lignans matairesinol and secoisolariciresinol. But it is not only dietary fibre-containing foods which contribute to the daily uptake of lignans from the nutrition, but also beverages such as tea and coffee (Br. J. Nutr. 2005, 93, 393-402). The extraction of glycosidically bonded matairesinol from various foodstuffs is carried out by means of methanol-water (70:30 v/v) with 0.3 M NaOH at 60° C. for 1 hr. Subsequently, the extracts obtained were enzymatically hydrolysed and extracted with diethyl ether.

The manufacturing of the compound of formula (1-(–)) can be carried out, for example, starting from compound (2-(–)) (–)-7-hydroxymatairesinol, for example, similarly to the method described in Org. Lett., 2003, 5 (4), 491-493.

Compound (2-(–)), (–)-7-hydroxymatairesinol ((3R,4R)-4-[(S)-hydroxy-(4-hydroxy-3-methoxyphenyl)methyl]-3-[(4-hydroxy-3-methoxyphenyl)methyl]oxolan-2-one), is, as described above for compound (1-(–)), contained in a large number of different foods. Particularly high concentrations have been identified in sesame seeds (*Sesamum indicum*) (Br. J. Nutr., 2005, 93, 393-402). Cereals such as wheat (*Triticum* sp.) or rye (*Secale cereale*) also contain large quantities of hydroxymatairesinol (J. Agric. Food Chem., 2007, 55, 1337-1346). One of the best sources for compound (2) is fir wood (*Picea abies*) (Phytochemistry 2005, 2, 331-340; Holzforschung 2003, 57, 27-36). Extraction from fir wood is carried out with acetone in a Soxhlet extractor. The extract obtained is then purified over silica gel in order to obtain hydroxymatairesinol (J. Agric. Food Chem. 2003, 51 (26), 7600-7606).

Compound (3-(+)), lariciresinol (4-[[(3R,4R,5 S)-5-(4-hydroxy-3-methoxyphenyl)-4-(hydroxymethyl)oxolan-3-yl]methyl]-2-methoxyphenol), is a further important plant lignan which has been found in relatively large quantities in various oil seeds, for example, linseed or sesame, but also in cereals and vegetables (e.g. cabbage, kale, Brussels sprouts, etc.) (Br. J. Nutr. 2005, 93, 393-402).

Compound (4-(–)), arctigenin ((3R,4R)-4-[(3,4-dimethoxyphenyl)methyl]-3-[(4-hydroxy-3-methoxyphenyl)methyl]oxolan-2-one), has been found, inter alia, in the seeds of *Arcticum lappa* (Phytochemistry, 1994, 37 (4), 1161-1164).

Compound (6-(–)), α-conidendrin ((3aR,9R,9aS)-7-hydroxy-9-(4-hydroxy-3-methoxy-phenyl)-6-methoxy-3a,4,9,9a-tetrahydro-1H-benzo[f][2]benzofuran-3-one), has been identified in various types of wood, for example, *Picea* sp., *Taxus* sp. or *Tsuga* sp. (Chem. Berichte, 1957, 90, 2857-2867; J. Org. Chem., 1945, 10, 216; 1945, 10, 219; Biol. Pharm. Bull., 2006, 29 (11), 2310-2312).

In accordance with the above description, one or more or all of the vanillyl lignans and/or the salts thereof to be used according to the invention can be components of a material gained from plants and used, in particular, in the form of plant extracts (possibly obtained following hydrolysis), preferably derived from one of the above-mentioned plants.

The invention therefore also concerns the use of a product obtained or obtainable from plant material, preferably by means of extraction and possibly subsequent hydrolysis, comprising one, two or more different vanillyl lignans as defined above, one, two or more different salts of one, two or more different vanillyl lignans as defined above, or a mixture of one, two or more different vanillyl lignans as defined above having one, two or more different salts of one, two or more different vanillyl lignans as defined above, for modifying the sensation or masking the unpleasant taste impression, preferably the bitter, astringent and/or metallic taste impression, of an unpleasant tasting substance, preferably of a bitter substance.

The manufacture of such products obtained or obtainable from plant material is preferably carried out by extraction from the relevant plants or plant parts, which can contain a plurality of different vanillyl lignans, for example, if the relevant plant contains a plurality of vanillyl lignans or a mixture of different plants is subjected to extraction. Depending on the plant, the extract obtained contains vanillyl lignans (not glycosidically bonded vanillyl lignans—see compounds (1) to (30)) or glycosidically bonded vanillyl lignans. If an extract contains glycosidically bonded vanillyl lignans, the relevant non-glycosidically bonded vanillyl lignans can be obtained by hydrolysis of the glycosidically bonded vanillyl lignans.

The compounds to be used according to the invention are relatively easy to isolate and have no appreciable intrinsic flavour in the concentrations preferably to be used according to the invention.

It has also been found that the vanillyl lignans to be used according to the invention are able to mask the bitter intrinsic flavour of another vanillyl lignan to be used according to the invention and possibly occurring in higher usage concentrations.

Unpleasant tasting substances within the context of this text are:

(a) substances which taste bitter, astringent, stodgy, chalky, dusty, dry, floury, rancid and/or metallic, and (b) substances which have a bitter, astringent, stodgy, chalky, dusty, dry, floury, rancid and/or metallic, aftertaste.

The above-mentioned unpleasant tasting substances can have further, not unpleasant taste and/or aroma qualities.

Within the context of this text, taste qualities that are designated as being not unpleasant are preferably the impressions of spicy, umami, sweet, salty, sour, sharp, cooling, warming, burning or tingling.

Substances which convey unpleasant taste impressions, in particular the taste impressions bitter, astringent and/or metallic (and possibly additionally stodgy, chalky, dusty, dry, floury and/or rancid) are, for example: xanthine alkaloids, xanthines (caffeine, theobromine, theophylline), alkaloids (quinine, brucine, strychnine, nicotine), phenolic glycosides (e.g. salicin, arbutin), flavonoid glycosides (e.g. neohesperedin, eriocitrin, neoeriocitrin, narirutin, hesperidin, naringin), chalcone or chalcone glycosides, dihydrochalcone glycosides (phloridzin, trilobtain), hydrolysable tannins (gallic or ellagic acid esters of carbohydrates, for example, pentagalloyl glucose), non-hydrolysable tannins (possibly galloylated catechins or epicatechins and the oligomers thereof, for example, proanthyocyanidins or procyanidins, thearubigenin), flavones and the glycosides thereof (e.g. quercetin, quercitrin, rutin, taxifolin, myricetin, myrictrin), other polyphenols (γ-oryzanol, caffeic acid or the esters thereof), terpenoid bitter substances (e.g. limonoids, such as limonin or nomilin from citrus fruits, lupolone and humolone from hops, iridoids, secoiridoids), absinthin from wormwood, amarogentin from gentian, metallic salts (potassium chloride, sodium sulphate, magnesium salts, iron salts, aluminium salts, zinc salts), pharmaceutical active ingredients (e.g. fluoroquinolone antibiotics, paracetamol, aspirin, β-lactam antibiotics, ambroxol, propylthiouracil [PROP], guaifenesin), vitamins (for example, vitamin H, vitamins belonging to the B series such as vitamin B1, B2, B6, B12, niacin, pantothenic acid), denatonium benzoate or other denatonium salts, sucralose octaacetate, urea, unsaturated fatty acids, in particular unsaturated fatty acids in emulsions, amino acids (e.g. leucine, isoleucine, valine, tryptophan, proline, histidine, tyrosine, lysine or phenylalanine), peptides (in particular peptides with an amino acid from the group leucine, isoleucine, valine, tryptophan, proline or phenylalanine at the N- or C-terminus). The above-mentioned substances can occur either individually or as a mixture, preferably also as natural extracts from fresh, dried, roasted and/or fermented plants or plant parts, thus for example, as extracts from leaves, fruits, branches, roots, fruit skins, kernels, seeds, for example, from *Camellia sinensis, Camellia japonica, Coffea* sp., Cocoa *theobroma, Vitis vinifera, Citrus* sp. and hybrids, *Poncirus* sp. and hybrids, *perilla, Humulus lupulus* or related species.

Bitter substances to be masked according to the invention are, in particular, xanthines (in particular caffeine, theobromine, theophylline), phenolic glycosides (in particular salicin, arbutin), flavonoid glycosides (in particular neohesperedin, eriocitrin, neoeriocitrin, narirutin, hesperidin, naringin), chalcone or chalcone glycosides, dihydrochalcone glycosides (in particular phloridzin, trilobtain), hydrolysable tannins (in particular gallic or ellagic acid esters of carbohydrates, for example, pentagalloyl glucose), non-hydrolysable tannins (in particular galloylated catechins or epicatechins and the oligomers thereof, for example, proanthyocyanidins or procyanidins, thearubigenins), flavones and the glycosides thereof (in particular quercetin, quercitrin, rutin, taxifolin, myricetin, myrictrin), caffeic acid or the esters thereof, terpenoid bitter substances (in particular limonin, nomilin, lupolone and humolone), metallic salts (potassium chloride, sodium sulphate, magnesium salts, iron salts, aluminium salts, zinc salts), pharmaceutical active ingredients (e.g. fluoroquinolone antibiotics, paracetamol, aspirin, β-lactam antibiotics, ambroxol, propylthiouracil [PROP], guaifenesin), amino acids (e.g. leucine, isoleucine, valine, tryptophan, proline, histidine, tyrosine, lysine or phenylalanine), peptides (in particular peptides with an amino acid from the group leucine, isoleucine, valine, tryptophan, proline or phenylalanine at the N- or C-terminus).

Further bitter substances that are preferably to be masked according to the invention are selected from the group consisting of caffeine, theobromine, quinine, salicin, arbutin, neohesperedin, eriocitrin, neoeriocitrin, narirutin, hesperidin, naringin, phloridzin, catechin, epicatechin, epigallocatechin gallate (EGCG), gallocatechin, gallocatechin-3-gallate, procyanidin B2, procyanidin B5, procyanidin C1, thearubigenin, quercetin, quercitrin, rutin, taxifolin, myricetin, myrictrin, caffeic acid and the esters thereof, limonin and nomilin, amino acids (e.g. leucine, isoleucine, valine, tryptophan, proline, histidine, tyrosine, lysine or phenylalanine), peptides with an amino acid from the group leucine, isoleucine, valine, tryptophan, proline or phenylalanine at the N- or C-terminus, potassium chloride, paracetamol, aspirin and β-lactam antibiotics.

Substances which have a bitter, astringent, stodgy, chalky, dusty, dry, floury, rancid and/or metallic by-taste and/or aftertaste can be aromatic substances or flavourings with a not unpleasant primary taste (for example, sweet, salty, spicy, sour) and/or aroma and can belong to the group of sweeteners, sugar substitutes or aromatic substances. Examples are: aspartame, neotame, superaspartame, alitame, saccharin, sucralose, tagatose, monellin, monatin, stevioside, rubusoside, rebaudioside A, rebaudioside C, thaumatin, miraculin, glycyrrhizin, glycyrrhetinic acid or the derivatives thereof, cyclamate or the pharmaceutically acceptable salts of the above compounds.

In a preferred use according to the invention, at least one further substance is used in combination for modifying or masking the unpleasant taste impression of an unpleasant tasting substance.

In a further embodiment, the present invention therefore relates to a use as described above of the vanillyl lignans to be used according to the invention in combination with one, two or more further substances for modifying or masking the unpleasant, in particular bitter, taste impression of an unpleasant tasting substance, preferably a bitter substance.

Further substances for modifying or masking an unpleasant taste impression and/or for amplifying a pleasant taste impression, or flavour correctants, are preferably selected from the following group (M):

Nucleotides (e.g. adenosine-5'-monophosphate, cytidine-5'-monophosphate) or the pharmaceutically acceptable salts thereof, lactisoles, sodium salts (e.g. sodium chloride, sodium lactate, sodium citrate, sodium acetate, sodium gluconate), hydroxyflavanones, for example, eriodictyol, sterubin (eriodictyol-7-methylether), homoeriodictyol, and the sodium, potassium, calcium, magnesium or zinc salts thereof (in particular those disclosed in EP 1 258 200 A2, which, with respect to the corresponding compounds disclosed therein forms part of this application by reference), hydroxybenzoic acid amides, for example, 2,4-dihydroxybenzoic acid vanillyl amide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide-monosodium salt 2,4-dihydroxybenzoic acid-N-2-(4-hydroxy-3-methoxyphenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl)ethyl]amide; 4-hydroxybenzoic acid vanillyl amide (in particular such as is disclosed in WO 2006/024587, which with respect to the corresponding compounds disclosed therein forms part of this application by reference); hydroxydeoxybenzoins, for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)-ethanone, 1-(2-hydroxy-4-methoxyphenyl)-2-(4-hydroxy-3-methoxyphenyl)ethanone) (in particular such as is disclosed in WO 2006/106023, which with respect to the corresponding compounds disclosed therein forms part of this application by reference); hydroxyphenylalkane diones, such as, for example, gingerdione-[2], gingerdione-[3], gingerdione-[4], dehydrogingerdione-[2], dehydrogingerdione-[3], dehydrogingerdione-[4]) (in particular such as are disclosed in WO 2007/003527, which with respect to the corresponding compounds disclosed therein forms part of this application by reference); diacetyl trimers (in particular as disclosed in WO 2006/058893, which with respect to the corresponding compounds disclosed therein forms part of this application by reference); gamma-aminobutyric acids (in particular as disclosed in WO 2005/096841, which with respect to the corresponding compounds disclosed therein forms part of this application by reference); divanillins (in particular as disclosed in WO 2004/078302, which with respect to the corresponding compounds disclosed therein forms part of this application by reference) and 4-hydroxydihydrochalcones (preferably as disclosed in US 2008/0227867 A1, which with respect to the corresponding compounds disclosed therein forms part of this application by reference), and in particular phloretin and davidigenin, amino acids or mixtures of whey proteins with lecithins, hesperetin (as disclosed in WO 2007/014879, which with respect to these compounds becomes part of this application by reference), 4-hydroxydihydrochalcones as disclosed in WO 2007/107596, which with respect to these compounds becomes part of this application by reference, or propenylphenyl glycosides (chavicol glycosides) as disclosed in EP 1 955 601 A1, which with respect to these compounds becomes part of this application by reference, or extracts of Rubus suavissimus as disclosed in the U.S. Provisional Application 61/333,435 (Symrise), which with respect to these extracts becomes part of this application by reference, or extracts of Hydrangea macrophylla as disclosed in EP 2 298 084 A1, which with respect to these extracts becomes part of this application by reference, pellitorin and derived aroma compositions as disclosed in EP 2 008 530 A1, umami compounds as disclosed in WO 2008/046895 A1 and EP 1 989 944 A1, which in each case with respect to these compounds form part of this application by reference, and umami compounds as disclosed in EP 2 064 959 A1 and EP 2 135 516 A1, which with respect to the corresponding compounds disclosed therein form part of this application by reference.

Since the bitterness intensity of different bitter substances differs markedly, the bitterness of a compound is given below in relative bitter equivalents (RBE). The known bitter substance caffeine is used as the reference substance. The RBE value as a measure of the relative bitterness of a sample is determined using a scale from 1 to 10. A relative bitterness of 1, i.e. an RBE value of 1 corresponds to the bitterness of a quantity of caffeine at a dosage of 100 mg/kg of the test sample. A relative bitterness of 5, i.e. an RBE value of 5 corresponds to the bitterness of a quantity of caffeine at a dosage of 500 mg/kg of the test sample. The composition of the test sample can vary widely. Thus the test sample can be, for example, a preparation used for nutrition, for oral hygiene, for pleasure, an oral pharmaceutical preparation or a cosmetic preparation, for example, a foodstuff, a beverage, a chewing gum, a mouthwash, an item of confectionery, a cough syrup or a tablet.

The scale used for determining the RBE values complies with ISO 4121 [Sensory Analysis—Guidelines for the use of quantitative response scales; A.3 Example 2].

The members of the panel for determining the RBE values are selected according to ISO 8586-1 [Sensory Analysis—General guidance for the selection, training, and monitoring of assessors—Part 1: Selected assessors].

The number of panel members complies with ISO 8586-I, 4.2.3 [Number of persons to be selected, together with ISO 6658 Sensory analysis—Methodology—General guidance—5.3.5 Scoring (5 or more selected panel members)].

It was surprisingly found that the vanillyl lignans, mixtures and/or salts thereof to be used according to the invention are able—even in very low concentrations—to mask, that is, reduce or even entirely suppress unpleasant taste impressions, particularly the bitter taste impression of a large number of substances.

In particular, the bitter taste impression of methyl xanthines, for example caffeine, theobromine, alkaloids such as quinine, flavonoids such as naringin, (gallo-)catechins and gallates thereof, (gallo-)epicatechins and gallates thereof, phenols such as arbutin, salicin, and also inorganic salts such as potassium chloride or magnesium sulphate, pharmaceutical active ingredients such as denatonium benzoate, acetylsalicylic acid, acetaminophen, dextromorphan or β-lactam antibiotics can be masked, wherein it is especially advantageous that the vanillyl lignans, mixtures and/or salts thereof to be used according to the invention possess hardly any intrinsic taste in the low concentrations preferably used.

The substance to be masked is preferably a bitter substance which is contained in the preparation at a concentration corresponding to an RBE value of 1 and preferably of at least 2.

As mentioned above, one aspect of the present invention relates to the use of the vanillyl lignans, mixtures and/or salts thereof to be used according to the invention to mask the unpleasant taste impression of an unpleasant tasting substance, that is, as a flavour correctant.

Preferably, the vanillyl lignans, the mixtures and/or salts thereof to be used according to the invention are used in a preparation serving for nutrition, for oral hygiene or for pleasure, or a pharmaceutical preparation intended for oral administration, for cosmetic preparations (preferably for application in the region of the head), wherein the preparation typically includes one or more unpleasant, in particular bitter tasting substances.

In another aspect, the invention relates to a use as described above in a preparation selected from the group consisting of
(1) preparations for nutrition, nutritional supplementation, oral care or for pleasure,
(2) cosmetic preparations, preferably for application in the region of the head,
(3) pharmaceutical preparations intended for oral administration,
(4) intermediate products for the manufacturing of one of the preparations given in (1) to (3).

The intermediate products (4) can be preliminary products, semifinished products, concentrates, aromatic compositions, odoriferous compositions, flavouring compositions or seasoning mixtures.

The present invention further relates to a preparation selected from the group consisting of
(1) preparations for nutrition, nutritional supplementation, oral care or for pleasure,
(2) cosmetic preparations, preferably for application in the region of the head,
(3) pharmaceutical preparations intended for oral administration,
(4) intermediate products for the manufacturing of one of the preparations given in (1) to (3), comprising
  one, two or more unpleasant, particularly bitter, tasting substances and
  one, two or more different vanillyl lignans as defined above, or
  one, two or more different salts of one, two or more different vanillyl lignans as defined above, or a mixture of one, two or more different vanillyl lignans as defined above having one, two or more different salts of one, two or more different vanillyl lignans as defined above, wherein the quantity of the unpleasant, particularly bitter, tasting substance(s) is sufficient to be perceived as an unpleasant, particularly bitter, taste in a comparative preparation which contains neither one of the vanillyl lignans defined above, nor one of the salts defined above, but is otherwise identically composed and the quantity of the vanillyl lignan(s) defined above or of the salt(s) defined above or of the mixture defined above is sufficient to bring about sensory modification or masking of the unpleasant, particularly bitter taste impression of the unpleasant, particularly bitter, tasting substance(s), in comparison with the comparative preparation, provided that the preferably at least one unpleasant, particularly bitter, tasting substance in the preparation is not secoisolariciresinol.

Otherwise expressed, this means that an inventive preparation contains at least one unpleasant, particularly bitter, tasting substance in a suitable quantity and no secoisolariciresinol, or that an inventive preparation contains, together with secoisolariciresinol, at least one further unpleasant, particularly bitter, tasting substance in a corresponding quantity.

A person skilled in the art can distinguish a preparation according to the invention from a preparation not according to the invention by means of a simple comparison test. In this comparison test, the person skilled in the art investigates two preparations which are identically composed, except that one of the preparations, specifically the comparative preparation, contains neither one of the vanillyl lignans according to the invention as defined above, nor one of the salts defined above. If, during the sensory investigation of said two preparations, the unpleasant, particularly bitter, tasting substance is differently, particularly more strongly, perceptible in the comparative preparation, the other preparation under investigation is a preparation according to the invention.

In a preferred preparation according to the invention, the molar ratio of the total quantity of glycosidically bonded vanillyl lignans to the total quantity of not glycosidically bonded vanillyl lignans is 1:1 or less, preferably 1:10 or less, more preferably 1:50 or less, particularly preferably 1:100 or less.

In a preferred preparation according to the invention, the ratio of the total quantity of glycosidically bonded vanillyl lignans to the total quantity of not glycosidically bonded vanillyl lignans is 2:1 or less, preferably 1:1 or less, more preferably 1:5 or less, even more preferably 1:10 or less, particularly preferably 1:25 or less and most particularly preferably 1:50 or less.

In a preferred embodiment, a preparation according to the invention is characterised in that the, or one of the, unpleasant tasting substances is a bitter substance which is present in a concentration which corresponds to at least 2 relative bitter equivalents, or a plurality, or all, of the unpleasant tasting substances are bitter substances wherein the total concentration of all bitter substances corresponds to at least 2 relative bitter equivalents.

In a further, particularly preferred embodiment of the invention, the vanillyl lignans, the salts or mixtures thereof to be used according to the invention, are used in the preparations according to the invention in combination with at least one substance which has a sweet primary taste and a bitter by-taste and/or aftertaste. Preferable herein are combinations of the vanillyl lignans, the salts or mixtures thereof to be used according to the invention which have a sweet primary taste and additionally a bitter taste having at least an RBE value of 1, preferably having at least an RBE value of 2. Thus, by masking the bitter by-taste or aftertaste, the sweet taste impression of the sweet tasting substance can be significantly improved. Further particularly preferable is the further combination of the mixtures defined above with one or more of the pleasant substances, particularly the substances enhancing the sweet taste.

The preferred preparation according to the invention is characterised in that the quantity of the vanillyl lignan(s) defined above or of the salt(s) defined above or of the mixture defined above is sufficient to bring about sensory modification or masking of the unpleasant, particularly bitter, taste impression of the unpleasant, particularly bitter, tasting substance(s) such that said taste impression corresponds to the taste impression of a comparative preparation which contains, (i) neither one of the vanillyl lignans defined above, nor one of the salts defined above, and (ii) 90% by weight or less, preferably 80% by weight or less, more preferably 75% by weight or less, particularly preferably 70% by weight or less of the unpleasant, particularly bitter, tasting substance(s), but is otherwise identically composed.

A further preferred preparation according to the invention is characterised in that the quantity of the vanillyl lignan(s) defined above or of the salt(s) defined above or of the mixture defined above is sufficient to bring about sensory modification or masking of the unpleasant, particularly bitter, taste impression of the unpleasant, particularly bitter, tasting substance(s) such that said taste impression corresponds to the taste impression of a comparative preparation which contains, (i) neither one of the vanillyl lignans defined above, nor one of the salts defined above, and (ii) 50% by weight or less, preferably 40% by weight or less, more preferably 30% by weight or less, particularly preferably 20% by weight or less of the unpleasant, particularly bitter, tasting substance(s), but is otherwise identically composed.

A preferred preparation according to the invention is characterised in that the, or one of the, unpleasant tasting substances is a bitter substance which is present in a concentration of at least twice the bitterness threshold value thereof, preferably in the range of twice to one thousand times the bitterness threshold value thereof. Preferably, the bitter substance is present in a concentration in the range of five times to five hundred times the bitterness threshold value thereof, preferably in a concentration of ten times to two hundred times the bitterness threshold value thereof.

The definition of the bitterness threshold value and the determination of the bitterness threshold value in a preparation are known to a person skilled in the art (see J. Agric. Food Chem. 2005, 53, 5407-5418 and J. Agric. Food Chem. 2005, 53, 5377-5384).

A preferred preparation according to the invention contains one, two or more of the following bitter substances:
catechins and proanthocyanidins in a total quantity of at least 0.05% by weight, preferably at least 0.1% by weight, more preferably in the range of 0.2% to 1% by weight,
caffeine and theobromine in a total quantity of at least 0.05% by weight, preferably at least 0.25% by weight, more preferably at least 0.5% by weight, most preferably in the range of 1% to 2.5% by weight, naringin in a concentration of at least 0.025% by weight, preferably at least 0.1% by weight, more preferably in the range of 0.2% to 2% by weight, sweeteners in a total quantity of at least 0.005% by weight, preferably at least 0.05% by weight, more preferably in the range of 0.1% to 2% by weight, in each case, relative to the total weight of the preparation.

Preparations according to the invention can be present, for example, as semifinished products, odoriferous compositions, aromatic substance or flavouring compositions or as seasoning mixtures.

Preparations according to the invention preferably contain at least one, two, three, four, five, six, seven, eight or more further aromatic substances.

In the context of the present invention, the (one or more) aromatic substances to be used are preferably selected from the following group (A) consisting of:

acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienal, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-5 (or 2)-methyl-3 (2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2(5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Preparations used for nutrition or for pleasure in the context of this text are, for example, baked products (e.g. bread, biscuits, cakes, other baked goods), confectionery (e.g. chocolates, chocolate bar products, other bar products, fruit gums, hard and soft toffees, chewing gum), alcoholic or nonalcoholic beverages (e.g. coffee, tea, wine, wine-containing beverages, beer, beer-containing beverages, liqueurs, spirits, brandies, fruit-containing lemonades, isotonic beverages, refreshing beverages, nectars, fruit and vegetable juices, fruit or vegetable juice preparations), instant beverages (e.g. instant-cocoa beverages, instant-tea beverages, instant-coffee beverages), meat products (e.g. ham, processed sausage or raw sausage preparations, spiced or marinated fresh or cured meat products), eggs or egg products (dried egg, egg white, egg yolk), cereal products (e.g. breakfast cereals, muesli bars, precooked prepared rice products), milk products (e.g. milk beverages, milk ices, yoghurt, kefir, fresh cheese, soft cheese, hard cheese, dried milk powder, whey, butter, buttermilk, partially or fully hydrolyzed lactoprotein-containing products), products from soybean protein or other soybean fractions (e.g. soybean milk and products prepared therefrom, preparations containing soybean lecithin, fermented products such as tofu or tempeh or products prepared therefrom, soy sauces), fruit preparations (e.g. jellies, fruit ices, fruit sauces, fruit fillings), vegetable preparations (e.g. ketchup, sauces, dried vegetables, frozen vegetables, precooked vegetables, vegetables pickled in vinegar, preserved vegetables), nibbles (e.g. baked or fried potato chips or potato dough products, bread dough products, extruded products based on maize or peanuts), fat-based and oil-based products or emulsions thereof (e.g. mayonnaise, remoulade, dressings, seasoning preparations), other ready-meals and soups (e.g. dried soups, instant soups, precooked soups), spices, seasoning mixtures and in particular seasonings which are used, for example, in the making of snacks.

The preparations within the meaning of the invention can also serve as semifinished products for making further preparations used for nutrition or pleasure. The preparations within the meaning of the invention can also be provided in the form of capsules, tablets (uncoated and coated tablets, for example, enteric coatings), sugar-coated pills, granules, pellets, solid mixtures, dispersions in liquid phases, as emulsions, as powders, as solutions, as pastes or as other preparations to be swallowed or chewed as food supplements.

A preferred preparation according to the invention contains one, two or more different vanillyl lignans as defined above, and/or one, two or more different salts of one, two or more different vanillyl lignans as defined above, in a total quantity of the vanillyl lignans defined above and of the salts defined above in the range of 10 mg/kg to less than 300 mg/kg, preferably in the range of 12 mg/kg to 100 mg/kg relative to the total weight of the preparation, provided that preferably at least one unpleasant, particularly bitter, tasting substance contained in the preparation is not secoisolariciresinol.

Preparations according to the invention and preferred preparations according to the invention therefore differ from directly consumable foods, for example, the oilseeds of sesame or flax, which contain the vanillyl lignans to be used according to the invention together with secoisolariciresinol in the free, that is not glycosidically bonded, form in high concentrations. Not preferred according to the invention are directly consumable preparations to which vanillyl lignans are added for a purpose other than that according to the invention at a high concentration, particularly in quantities above 300 mg/kg. Also not preferred according to the invention are preparations such as, for example, nutritional supplements which contain vanillyl lignans due to the health-promoting effects thereof, because these preparations often contain the vanillyl lignans concerned in high doses.

Preparations used for oral care within the meaning of this text are, in particular, oral care and/or tooth care products such as toothpastes, tool gels, tooth powders, mouthwashes, chewing gums and other oral care products containing at least one bitter tasting substance with an RBE value of 2 or more.

Oral pharmaceutical preparations within the meaning of this text are preparations which are provided in the form of capsules, tablets (uncoated and coated tablets, for example, with enteric coatings), sugar-coated pills, granules, pellets, solid mixtures, dispersions in liquid phases, as emulsions, as powders, as solutions, as pastes or as other preparations to be swallowed or chewed, and are used as prescription-only, pharmacy-only or other medicinal products or as nutritional supplements and preferably comprise at least one bitter tasting substance with an RBE of 2 or more.

Other typical active substances, base substances, auxiliary substances and additives for preparations according to the invention, in particular for nutrition, for oral care or for semiluxury food products or oral pharmaceutical preparations can preferably be contained in amounts in the range from 1% to 99.999% by weight, preferably in the range of 10% to 80% by weight relative to the total weight of the preparation. Moreover, the preparations can contain water in an amount up to 99.9% by weight, preferably in the range of 5% to 80% by weight, relative to the total weight of the preparation.

The preparations according to the invention containing one or more of the vanillyl lignans, the salts or mixtures thereof to be used according to the invention are produced according to a preferred embodiment in that the vanillyl lignans, the salts or mixtures thereof to be used according to the invention, are incorporated as substances, as a solution or in the form of a mixture with a solid or liquid carrier into a basic preparation used for nutrition, for oral care, for pleasure or for oral pharmaceutical use. Advantageously, preparations according to the invention provided as solutions can also be converted into a solid preparation by spray drying.

According to another preferred embodiment, for the production of preparations according to the invention, the vanillyl lignans, the salts or mixtures thereof to be used according to the invention and possibly other constituents of the preparation according to the invention are also incorporated beforehand in emulsions, in liposomes, for example, starting from phosphatidylcholine, in microspheres, in nanospheres or also in capsules, granules or extrudates from a matrix suitable for foodstuffs and semiluxury food products, for example, made from starch, starch derivatives, cellulose or cellulose derivatives (e.g. hydroxypropylcellulose), other polysaccharides (e.g. alginate), natural fats, natural waxes (e.g. beeswax, carnauba wax) or from proteins, for example, gelatin.

In another preferred production method for preparations according to the invention, the vanillyl lignans, the salts or mixtures thereof to be used according to the invention are complexed beforehand with one or more suitable complexing agents, for example, with cyclodextrins or cyclodextrin derivatives, preferably α- or β-cyclodextrin, and used in this complexed form.

Particularly preferable is a preparation according to the invention wherein the matrix is selected such that the vanillyl lignans or the salts or mixtures thereof, to be used according to the invention are released from the matrix in a delayed manner, resulting in a long-lasting action.

As further constituents for preparations according to the invention, which are preferably used for nutrition or for pleasure, it is possible to use usual base materials, auxiliaries and additives for foodstuffs and semiluxury food products, for example, water, mixtures of fresh or processed plant or animal basic or raw materials (e.g. raw, roasted, dried, fermented, smoked and/or boiled meat, bone, cartilage, fish, vegetables, fruit, herbs, nuts, vegetable or fruit juices or pastes or mixtures thereof), digestible or indigestible carbohydrates (e.g. sucrose, maltose, fructose, glucose, dextrins, amylose, amylopectin, inulin, xylans, cellulose, tagatose), sugar alcohols (e.g. sorbitol, erythritol), natural or hardened fats (e.g. tallow, lard, palm oil, coconut oil, hardened plant fat), oils (e.g. sunflower oil, peanut oil, corn oil, olive oil, fish oil, soybean oil, sesame oil), fatty acids or salts thereof (e.g. potassium stearate), proteinogenic or nonproteinogenic amino acids and related compounds (e.g. γ-aminobutyric acid, taurine), peptides (e.g. glutathione), native or processed proteins (e.g. gelatin), enzymes (e.g. peptidases), nucleic acids, nucleotides, other flavour correctants for unpleasant taste impressions, taste modulators for further, as a rule not unpleasant, taste impressions, flavour-modulating substances (e.g. inositol phosphate, nucleotides such as guanosine monophosphate, adenosine monophosphate or other substances such as sodium glutamate or 2-phenoxypropionic acid), emulsifiers (e.g. lecithins, diacylglycerols, gum arabic), stabilisers (e.g. carrageenan, alginate), preservatives (e.g. benzoic acid, sorbic acid), antioxidants (e.g. tocopherol, ascorbic acid), chelating agents (e.g. citric acid), organic or inorganic acidifying agents (e.g. malic acid, acetic acid, citric acid, tartaric acid, phosphoric acid), additional bitter substances (e.g. quinine, caffeine, limonin, amarogentin, humolones, lupolones, catechins, tannins), sweeteners (e.g. saccharin, cyclamate, aspartame, neotame), mineral salts (e.g. sodium chloride, potassium chloride, magnesium chloride, sodium phosphates), substances preventing enzymatic browning (e.g. sulphite, ascorbic acid), essential oils, plant extracts, natural or synthetic dyes or coloured pigments (e.g. carotenoids, flavonoids, anthocyans, chlorophyll and derivatives thereof), spices, trigeminally effective substances or plant extracts containing said trigeminally effective substances, synthetic, natural or nature-identical aromatic substances or odoriferous substances and odour correctants.

Dental care products according to the invention (as an example of preparations used for oral hygiene), which contain the vanillyl lignans, the salts or mixtures thereof, to be used according to the invention, generally comprise an abrasive system (abrasive or polishing agent), for example, silicic acids, calcium carbonates, calcium phosphates, aluminum oxides and/or hydroxyapatites, surface-active substances, for example, sodium lauryl sulphate, sodium lauryl sarcosinate and/or cocamidopropyl betaine, humectants, for example, glycerol and/or sorbitol, thickening agents, for example, carboxymethyl cellulose, polyethylene glycols, carrageenan and/or Laponite®, sweeteners, for example, saccharin, flavour correctants for unpleasant taste impressions, flavour correctants for further, as a rule not unpleasant taste impressions, taste-modulating substances (e.g. inositol phosphate, nucleotides such as guanosine monophosphate, adenosine monophosphate or other substances such as sodium glutamate or 2-phenoxypropionic acid), substances with a cooling effect, for example, menthol, menthol derivatives (e.g. L-menthol, L-menthyl lactate, L-menthyl alkyl carbonates, menthone ketals, menthane-carboxylic acid amides), 2,2,2-trialkyl acetic acid amides (e.g. 2,2-diisopropylpropionic acid methyl amide), icilin derivatives, stabilisers and active substances, for example sodium fluoride, sodium monofluorophosphate, tin difluoride, quaternary ammonium fluorides, zinc citrate, zinc sulphate, tin pyrophosphate, tin dichloride, mixtures of various pyrophosphates, triclosan, cetylpyridinium chloride, aluminium lactate, potassium citrate, potassium nitrate, potassium chloride, strontium chloride, hydrogen peroxide, aromatic substances and/or sodium bicarbonate or odour correctants.

As further constituents for (oral) pharmaceutical preparations according to the invention, it is possible to use all the usual further active ingredients, base substances, excipients and additives for oral pharmaceutical preparations. As active ingredients, it is also possible, in particular, to use unpleasant-tasting formulable oral active pharmaceutical ingredients. The active ingredients, base substances, excipients and additives can be converted by known means into the oral application forms. This is often carried out using inert, non-toxic, pharmaceutically suitable excipients. Said excipients include, inter alia, carriers (e.g. microcrystalline cellulose), solvents (e.g. liquid polyethylene glycols), emulsifiers (e.g. sodium dodecyl sulphate), dispersing agents (e.g. polyvinylpyrrolidone), synthetic and natural biopolymers (e.g. albumin), stabilisers (e.g. antioxidants such as ascorbic acid), colorants (e.g. inorganic pigments such as iron oxides) and odour correctants and others and/or flavour correctants not affecting the bitter taste.

Preferably, the preparations according to the invention can also contain an aromatic composition to round off and improve the taste and/or odour of the preparation. Suitable aromatic compositions contain, for example, synthetic or natural aromatic, odoriferous and flavouring substances as well as suitable excipients and carriers. It is regarded as being particularly advantageous that any bitter, astringent and/or metallic taste impression originating from the aromatic or odoriferous substances contained in the preparations without the vanillyl lignans, the salts or mixtures thereof to be used according to the invention, can be masked and therefore the overall aroma or taste profile is improved.

Preferably, the preparations according to the invention can also contain an aromatic composition to round off and improve the taste and/or odour of the preparation. Suitable aromatic compositions contain, for example, synthetic or natural aromatic, odoriferous and/or flavouring substances, including saliva-stimulating, tingle-generating, sharp or warm tasting substances, essential oils or plant extracts, as well as suitable excipients and carriers. It is regarded as especially advantageous that any additional unpleasant, particularly bitter, astringent and/or metallic, taste impression from the aromatic, odoriferous and/or flavouring substances contained in the aromatic preparations can be masked, so that a better overall aroma or taste profile is produced in the preparations according to the invention.

Preparations according to the invention in the form of semifinished products, that is, intermediate products, preferably additionally contain at least one aromatic composition, wherein the aromatic composition comprises at least one, two, three, four, five or more synthetic or natural aromatic, odoriferous and/or flavouring substances. Said semifinished products can serve to mask unpleasant taste impressions, in particular to mask bitter, astringent and/or metallic taste impressions in finished preparations which are produced using the semifinished products.

Preparations according to the invention which are used as semifinished products contain vanillyl lignans, the salts or mixtures thereof, to be used according to the invention, in proportions in the range of 0.001% to 95% by weight, preferably 0.005% to 80% by weight, particularly preferably 0.01% to 50% by weight, relative to the total weight of semifinished product.

A series of compositions according to the invention is preferable. This includes compositions, in particular compositions suitable for consumption, comprising or consisting of one or more vanillyl lignans or the salts or mixtures thereof, as defined above and one or more components suitable for consumption.

A preliminary product according to the invention or a preparation according to the invention preferably contains one or more carriers, wherein said carriers can be solid or liquid (at 25° C. and 1013 mbar). As carriers, either individual substances or substance mixtures can be used.

In one embodiment, preparations according to the invention are preferably spray dried and the components, which are suitable for consumption, comprise solid carriers and possibly an aroma composition. Also preferred are compositions as described above, wherein the compositions are spray dried.

Advantageous solid carriers in these preferred (preferably spray dried) compositions according to the invention are silicon dioxide (silicic acid, silica gel), carbohydrates and/or carbohydrate polymers (polysaccharides), cyclodextrins, starches, degraded starches (hydrolysed starches), chemically or physically modified starches, modified cellulose, gum arabic, gum ghatti, tragacanth, gum karaya, carrageenan, guar germ meal, locust bean gum, alginates, pectin, inulin or xanthan gum. Preferred hydrolysed starch products are maltodextrins and dextrins.

Preferred solid carriers are silicon dioxide, gum arabic and maltodextrins, wherein maltodextrins with DE values in the range of 5 to 20 are preferred. It is unimportant which plant originally provided the starch for producing the starch hydrolysates. Maize-based starches are suitable and readily available, as are starches from tapioca, rice, wheat or potatoes. The carriers can also simultaneously serve as anticaking agents, as in the case of silicon dioxide.

The preferred or particularly preferred carriers are also preferred due to being completely or substantially taste-free. In this way, preferred preliminary products according to the invention can be used in many different product types and preparations because said preliminary products do not, or not substantially, influence the existing sensory profile, particularly the aroma and taste profile—apart from the unpleasant taste impressions to be masked.

Preferred solid carriers are maltodextrins, wherein maltodextrins with DE values in the range of 15 to 20 are advantageous.

Also preferred are mixtures of maltodextrin and gum arabic.

The degree of decomposition of the starch is usually denoted with the characteristic value "Dextrose Equivalent" (DE) which can vary between the limit values 0 for a long-chain glucose polymer and 100 for pure glucose.

Preferably, at least one of the solid carriers is not selected from the group consisting of sugar, starch and gelatin.

Preferred liquid carriers are ethanol, iospropanol, glycerin, 1,2-propylene glycol, diacetin, triacetin and mixtures thereof.

Further suitable carriers are triglycerides, preferably liquid triglycerides, for example, plant oils. Preferable are triglycerides with the same or different $C_6$ to $C_{10}$-fatty acid groups (MCT, medium-chain triglycerides), since these are also essentially taste-free.

The invention therefore also concerns a preliminary product, preferably for manufacturing a preparation according to the invention, preferably a preparation in one of the embodiments identified as preferred, containing
- one, two or more different vanillyl lignans as defined above, or
- one, two or more different salts of one, two or more different vanillyl lignans as defined above, or
- a mixture of one, two or more different vanillyl lignans as defined above having one, two or more different salts of one, two or more different vanillyl lignans as defined above, and one or more carriers suitable for consumption and preferably selected from the group consisting of ethanol, isopropanol, glycerin, 1,2-propylene glycol, diacetin, triacetin, maltodextrin, gum arabic, silicon dioxide and mixtures thereof, and preferably additionally, one, two, three, four, five or more different aromatic substances.

Preliminary products according to the invention which contain one or more of the aforementioned carriers, in particular the solid or liquid carriers defined as preferred, are also excellently well suited, due to being (largely) lacking in taste, to being further processed into consumable preparations according to the invention.

In a preferred preliminary product according to the invention, the molar ratio of the total quantity of glycosidically bonded vanillyl lignans to the total quantity of not glycosidically bonded vanillyl lignans is 1:1 or less, preferably 1:10 or less, more preferably 1:50 or less, particularly preferably 1:100 or less.

A preferred preliminary product according to the invention comprises one, two, three, four, five or more different aromatic substances, preferably selected from the above group (A).

A preferred preliminary product according to the invention comprises one, two, three or more different further substances for modifying or masking an unpleasant taste impression and/or for amplifying a pleasant taste impression, and/or flavour correctants, preferably selected from the above group (M).

In a further preferred embodiment, a preliminary product according to the invention, apart from comprising one, two, three, four, five or more different aromatic substances selected from the above group (A), also comprises one, two, three or more different further substances for modifying or masking an unpleasant taste impression and/or for amplifying a pleasant taste impression, and/or flavour correctants selected from the above group (M).

In a further, particularly preferred embodiment of the invention, the vanillyl lignans, the salts or mixtures thereof to be used according to the invention are used in the preparations according to the invention in combination with at least one further substance for modifying or masking the unpleasant taste impression of an unpleasant tasting substance. In this way, particularly effective masking can be achieved. In particular, the combination of the vanillyl lignans, the salts or mixtures thereof to be used according to the invention with other flavour correctants for unpleasant, particularly bitter, taste impressions is preferable.

The invention also relates to a method for (a) modifying or masking the unpleasant, particularly bitter, taste impression of one, two or more unpleasant, particularly bitter, tasting substances and/or (b) manufacturing a preparation according to the invention, preferably in one of the embodiments identified as preferred, comprising the following step:

bringing into contact or mixing the unpleasant, particularly bitter, tasting substances with
- one, two or more different vanillyl lignans as defined above,
or
- one, two or more different salts of one, two or more different vanillyl lignans as defined above,
or
- a mixture of one, two or more different vanillyl lignans as defined above having one, two or more different salts of one, two or more different vanillyl lignans as defined above.

The method is carried out in such a way that the quantity of the vanillyl lignan(s) defined above or of the salt(s) defined above or of the mixture defined above is sufficient to bring about sensory modification or masking of the unpleasant, particularly bitter taste impression of the unpleasant, particularly bitter, tasting substance(s) as compared with the comparative preparation, which contains neither one of the vanillyl lignans defined above, nor one of the salts defined above A method according to the invention comprises the following steps:
(i) manufacturing an extract, containing
one, two or more different vanillyl lignans as defined above,
one, two or more different salts of one, two or more different vanillyl lignans as defined above,
or
a mixture of one, two or more different vanillyl lignans as defined above having one, two or more different salts of one, two or more different vanillyl lignans as defined above,
by extraction from plant material;
(ii) optionally further processing of the extract manufactured in step (i) to a further processed product, containing
one, two or more different vanillyl lignans as defined above,
one, two or more different salts of one, two or more different vanillyl lignans as defined above,
or
a mixture of one, two or more different vanillyl lignans as defined above having one, two or more different salts of one, two or more different vanillyl lignans as defined above,
(iii) bringing into contact or mixing the unpleasant, particularly bitter, tasting substance(s) with the extract manufactured in step (i) and/or with the further processed product manufactured in step (ii).

In a further embodiment, the invention relates to the preparation, preferably in one of the embodiments designated as preferred, able to be manufactured according to a method according to the invention, preferably in the embodiment designated as preferred.

EXAMPLES

The examples serve to illustrate the invention, but without restricting the invention. Unless otherwise stated, all values relate to weight.

Example of Use 1

Bitterness-Reduction in a Bitter Substance Solution

In order to quantify a reduction in the bitterness impression in a sample, the bitterness of a caffeine solution containing 500 ppm was compared by a panel of experts, in each case with a sample containing 500 ppm caffeine and also the respectively given quantity of a substance to be assessed (with regard to the ability thereof to reduce bitterness), with assessment on a scale from 1 (not bitter) to 10 (extremely bitter). For the evaluation, i.e. the calculation of the reduction (in %) of the bitterness impression, in each case, the mean values of the estimates by the expert panel for the caffeine solution and the sample to be compared, which contained caffeine and a substance under assessment were used. In addition to caffeine, other bitter substances such as theobromine, naringin, quinine hydrochloride dihydrate and salicin were tested using the same method.

| Test substance Comparative example: | Bitter substance | Bitterness impression (on scale of 1-10) | | Reduction in the bitterness impression |
|---|---|---|---|---|
| | | a) without test substance | b) with test substance | |
| 25 ppm secoisolariciresinol | 500 ppm caffeine | 3.9 ± 1.8 | 5.2 ± 2.6 | Amplification by 34% |
| 25 ppm (−)-matairesinol (1-(−)) | 500 ppm caffeine | 4.1 ± 0.9 | 2.7 ± 1.77 | 35.5%* |
| 25 ppm (−)-hydroxymatairesinol(2-(−)) | 500 ppm caffeine | 4.4 ± 2.15 | 2.6 ± 1.72 | 41.9%* |
| 25 ppm (+)-lariciresinol (3-(+)) | 500 ppm caffeine | 4.7 ± 1.11 | 2.9 ± 1.41 | 38.6%* |
| 25 ppm (−)-arctigenin (4) | 500 ppm caffeine | 3.2 ± 1.65 | 2.8 ± 1.68 | 11.5% |
| 25 ppm (+)-isolariciresinol (5-(+)) | 500 ppm caffeine | 4.5 ± 2.61 | 4.1 ± 2.21 | 10.3% |
| 25 ppm (−)-α-conidendrin (6-(−)) | 500 ppm caffeine | 3.5 ± 1.77 | 2.5 ± 0.94 | 20.8% |
| 25 ppm (−)-matairesinol (1-(−)) | 300 ppm theobromine | 4.5 ± 2.01 | 3.4 ± 1.49 | 24.7% |
| 25 ppm (−)-matairesinol (1-(−)) | 100 ppm naringin | 5.8 ± 2.19 | 4.9 ± 2.38 | 15.1% |
| 25 ppm (+)-lariciresinol (3-(+)) | 300 ppm theobromine | 4.2 ± 1.65 | 3.7 ± 2.24 | 10.7% |
| 25 ppm (+)-lariciresinol (3-(+)) | 250 ppm salicin | 6.8 ± 2.36 | 5.7 ± 2.97 | 17.1% |
| 25 ppm (+)-lariciresinol (3-(+)) | 5 ppm quinine hydrochloride dihydrate | 3.6 ± 1.81 | 2.5 ± 1.02 | 30.9%* |
| 25 ppm (+)-lariciresinol (3-(+)) | 100 ppm naringin | 6.0 ± 1.65 | 3.6 ± 1.75 | 39.5%* |

*significant

The solution containing Compound 1 was also described with the following sensory impressions: "slightly sweetish".

The solution containing Compound 2 was also described as sensorily neutral.

The solution containing Compound 3 was also described with the following sensory impressions: "slightly sweet, milky".

The solution containing Compound 4 was also described with the following sensory impressions: "very neutral, milky".

The solution containing Compound 5 was also described with the following sensory impressions: "anaesthetising, slightly woody".

The solution containing Compound 6 was also described with the following sensory impressions: "milky".

Example of Use 2

Bitterness and Astringency-Reduction in a Bitter Substance Solution Over Time

In order to quantify the reduction in the bitterness or astringency impression in a sample over a particular period of time, the bitterness or astringency of a solution containing 750 ppm epigallocatechin gallate (EGCG) was compared by a panel of experts, in each case with a sample containing 750 ppm epigallocatechin gallate and also the respectively shown quantity of a substance to be assessed (with regard to the ability thereof to reduce bitterness and/or astringency), in this case matairesinol (Compound 1-(−)).

Assessment was carried out on a scale from 1 (not bitter) to 10 (extremely bitter) or 1 (not astringent) to 10 (extremely astringent). The assessment by the panelists was carried out at specified time points (10 seconds, 30 seconds, 50 seconds and 70 seconds after ingestion of the respective sample). The samples were assessed by the panellists one after another following neutralisation. For the evaluation, i.e. the calculation of the reduction (in %) of the bitterness impression or astringency impression, at each time point, the mean values of the estimates by the expert panel for the epigallocatechin gallate solution and the sample to be compared therewith which contained the epigallocatechin gallate and the substance under assessment (in this case: matairesinol (Compound 1-(−)) were used.

| Test substance | Bitter substance | Time (s) | % reduction in the bitterness impression | % Reduction in the astringency impression |
|---|---|---|---|---|
| 100 ppm (−)-matairesinol (1-(−)) | 750 ppm EGCG | 0 | −15% | −11% |
| | | 10 | −30%* | −10%* |
| | | 30 | −38%* | −15% |
| | | 50 | −33%* | −20% |
| | | 70 | −28% | −23% |

*significant

Example of Use 3

Aromatic Compositions

| Substance contained | Aromatic composition (use in % by weight) | | | | | | | |
|---|---|---|---|---|---|---|---|---|
| | A | B | C | D | E | F | G | H |
| (−)-matairesinol (1-(−)) | | 10 | 10 | 10 | 5 | 10 | 15 | |
| (−)-hydroxymatairesinol(2-(−)) | 10 | | 10 | 5 | 10 | 10 | | 15 |
| Homoeriodictyol | 5 | | 2.5 | | | | | |
| Eriodictyol | | 2.5 | | | | | | |
| Phloretin | | | | 1 | | | | |
| Hesperetin | | | | | 0.5 | | | |
| 10% by weight of trans-pellitorin (e.g. as per WO 2004/043906) in 1,2-propylene glycol/diethyl malonate | | | | 0.25 | 0.25 | 0.5 | 0.25 | |
| Extract from *Hydrangea macrophylla*, containing phyllodulcin (as per EP 2 298 084 A1) | 2.5 | | 2.5 | | | | | 2.5 |
| Extract from *Rubus sauvissimus* containing rubusoside (as per U.S. Provisional Application 61/333,435 (Symrise)). | | 2.5 | 2.5 | | | | | |
| 1,2-proylene glycol | — | 20 | — | up to 100 | up to 100 | 20 | up to 100 | — |
| Glycerin | — | up to 100 | — | 20 | 20 | up to 100 | 20 | — |
| Maltodextrin | up to 100 | — | up to 100 | — | — | — | — | up to 100 |

The substances contained—with the exception of 1,2-propylene glycol, glycerin and maltodextrin—were mixed together in the quantity ratios given above in each case and were then either added to 1,2-propylene glycol and/or glycerin and were dissolved therein with gentle warming, or were homogenously mixed with the solid carrier material maltodextrin.

Example of Use 4

Spray-Dried Preparation as Semifinished Product for Aromatising Finished Goods

| Substance contained | Use in % by weight | | |
|---|---|---|---|
| Preparation | A | B | C |
| Drinking water | 60.8% | 60.8% | 60.8% |
| Maltodextrin from wheat | 24.3% | 24.3% | 24.3% |
| Gum arabic | 6.1% | 6.1% | 6.1% |
| (−)-matairesinol, Compound 1-(−). | 8.8% | — | 4.4% |
| (−)-hydroxymatairesinol, Compound 2-(−) | — | 8.8% | 4.4% |

The drinking water was placed in a container and the maltodextrin and gum arabic were dissolved therein. Subsequently, Compound 1 and/or Compound 2 were emulsified into the carrier solution in a Turrax. The temperature of the spray solution should not exceed 30° C. The mixture is then spray-dried (target temperature on input: 185-195° C., target temperature on output: 70-75° C.). The spray-dried semifinished product contains approximately 18-22% of Compounds 1 and/or 2.

Example of Use 5

Tea Preparation

| Substance contained | Use in % by weight | | |
|---|---|---|---|
| Preparation | A | B | C |
| Black tea, Ceylon, leaves | 94% | — | — |
| Green tea, China, leaves | — | 92% | — |
| Mate tea, Peru, leaves | — | — | 95% |
| Semifinished product A from Example 2 | 6% | — | — |
| Semifinished product B from Example 3 | — | 8% | — |
| Semifinished product C from Example 3 | — | — | 5% |

The tea and semifinished product were mixed and packaged into tea bags made of filter paper. To use, a tea bag has 100-250 ml boiling water poured over and is left to brew for 2-5 minutes.

Example of Use 6

Black Tea Preparation

| Substance contained | Use in % by weight |
|---|---|
| Black tea, Ceylon, leaves | 94 |
| Semifinished product A from Example 3 | 3 |
| Semifinished product B from Example 3 | 3 |

The tea and semifinished products were mixed and packaged into tea bags made of filter paper. To use, a tea bag has 100-250 ml boiling water poured over and is left to brew for 2-5 minutes.

Example of Use 7

Iced Tea Beverage (Black Tea)

The compounds (−)-matairesinol (Compound 1-(−)), or (−)-hydroxymatairesinol (Compound 2-(−)) were each pre-dissolved to 10% in ethanol. Black tea extract was dissolved in water and stirred together with sugar, an aromatic preparation (peach flavour) and the ethanolic solutions of Compounds 1-(−)(Preparation A) or 2-(−)(Preparation B) in a beaker.

| Substance contained | Use in % by weight | |
|---|---|---|
| Preparation | A | B |
| Black tea extract | 1.4% | 1.4% |
| Water | 89.5% | 89.5% |
| Aromatic preparation (peach type) | 0.65% | 0.65% |
| Sugar | 7% | 7% |
| Citric acid (crystalline) | 1.2% | 1.2% |
| Ascorbic acid | 0.2% | 0.2% |
| (−)-matairesinol (Compound 1-(−)) in ethanol (10%) | 0.05% | — |
| (−)-hydroxymatairesinol (Compound 2-(−)) in ethanol (10%) | — | 0.05% |

Example of Use 8

Iced Tea Beverage (Green Tea, Sugar-Reduced)

The compounds (−)-matairesinol (Compound 1-(−)), or (−)-hydroxymatairesinol (Compound 2-(−)) were each pre-dissolved to 10% in ethanol. Green tea extract was dissolved in water and stirred together with sugar and the sweetener saccharin or rebaudioside A, an aromatic preparation (lemon flavour) and the ethanolic solutions of Compounds 1-(−) (Preparation A) or 2-(−)(Preparation B) in a beaker.

| Substance contained | Use in % by weight | |
|---|---|---|
| Preparation | A | B |
| Green tea extract | 1.4% | 1.4% |
| Water | 92.95% | 93.03% |
| Aromatic preparation (lemon type) | 0.65% | 0.65% |
| Sugar | 3.45% | 3.45% |
| Sweetener saccharin | 0.1% | — |
| Sweetener rebaudioside A | — | 0.02% |
| Citric acid (crystalline) | 1.2% | 1.2% |
| Ascorbic acid | 0.2% | 0.2% |
| (−)-matairesinol (Compound 1-(−)) in ethanol (10%) | 0.05% | — |
| (−)-hydoxymatairesinol (Compound 2-(−)) in ethanol (10%) | — | 0.05% |

Example of Use 9

Iced Tea Beverage (Black Tea, Sugar-Free)

The compounds (−)-matairesinol (Compound 1-(−)), or (−)-hydroxymatairesinol (Compound 2-(−)) were each pre-dissolved in ethanol. Black tea extract was dissolved in water and stirred together with the sweetener rebaudioside A, an aromatic preparation (lemon flavour) and the ethanolic solutions of Compounds 1-(−)(Preparation A) or 2-(−) (Preparation B) in a beaker.

| Substance contained | Use in % by weight | |
|---|---|---|
| Preparation | A | B |
| Black tea extract | 1.4% | 1.4% |
| Water | 96.465% | 96.465% |
| Saccharin | 0.035% | 0.035% |
| Aromatic preparation (lemon type) | 0.65% | 0.65% |
| Citric acid (crystalline) | 1.2% | 1.2% |
| Ascorbic acid | 0.2% | 0.2% |
| (−)-matairesinol (Compound 1-(−)), 10% in ethanol | 0.05% | — |
| (−)-hydoxymatairesinol (Compound 2-(−)), 10% in ethanol | — | 0.05% |

Example of Use 10

Soluble Cappuccino Beverage

The raw materials cited were mixed together. In each case, 12.5 g of the Instant Cappuccino powder made was dissolved in 150 ml hot water.

| Substance contained | Use in % by weight | |
|---|---|---|
| Preparation | A | B |
| Coffee extract, spray dried | 14.0 | 16.0 |
| Sugar | 28.3 | 25.3 |
| Fat powder | 18.2 | 18.2 |
| Coffee whitener, foaming | Up to 100 | Up to 100 |
| Hydrocolloids/emulsifiers | 1.8 | 1.8 |
| Lactose | 4.7 | 4.7 |
| Semifinished product A from Example of use 3 | 3.0 | — |
| Semifinished product B from Example of use 3 | — | 6.0 |

Example of Use 11

Soya Beverage

The compounds matairesinol (1-(−)), or hydroxymatairesinol (Compound 2-(−)) were each pre-dissolved in ethanol and added to a soya milk from a local supermarket. The mixture was stirred together with the milk aroma in a beaker.

| Substance contained | Use in % by weight | | | |
|---|---|---|---|---|
| Preparation | A | B | C | D |
| Soya milk (local supermarket, not aromatised unsweetened) | 96.75% | 99.725% | 98.33% | 97.65% |
| Vanilla aroma | 0.1% | 0.1% | | 0.05% |
| Milk aroma | | | 0.1% | 0.05% |
| Sucrose | 3% | | 1.5% | 2% |
| Sucralose | | 0.025% | 0.01% | |
| Na-saccharin | | | 0.01% | |
| Emulgum | 0.1% | 0.1% | | 0.1% |
| (−)-matairesinol (Compound 1-(−)), 10% in ethanol | 0.05% | | 0.05% | |
| (−)-hydoxymatairesinol (Compound 2-(−)), 10% in ethanol | | 0.05% | | 0.05% |
| Hesperetin, 5% in ethanol | | | | 0.1% |

Example of Use 12

Soya Beverage (with γ-Aminobutyric Acid)

γ-aminobutyric acid was pre-dissolved in water and (−)-hydroxymatairesinol (Compound 2-(−)) was pre-dissolved in ethanol and added to a soya milk from a local supermarket. The resulting mixture was stirred together with the milk aroma in a beaker.

| Substance contained | Use in % by weight |
|---|---|
| Soya milk (local supermarket) | 99.75% |
| Milk aroma | 0.1% |
| (−)-hydoxymatairesinol (Compound 2-(−)), 10% in ethanol | 0.05% |
| γ-aminobutyric acid (1% in water) | 0.1% |

Example of Use 13

Use in a Grapefruit Mice (−)-hydoxymatairesinol (Compound 2-(−)) was pre-dissolved in ethanol and added to a grapefruit juice from a local supermarket. The resulting mixture was stirred together in a beaker.

| Substance contained | Use in % by weight |
|---|---|
| Grapefruit juice (local supermarket) | 99.95% |
| (−)-hydoxymatairesinol (Compound 2-(−)), 10% in ethanol | 0.05% |

Example of Use 14

Bitter Chocolate

A bitter chocolate was made from the following raw materials and subsequently poured into rectangular moulds:

| Substance contained | Use in % by weight | Use in % by weight |
|---|---|---|
| Cocoa mass | 55.55 | Up to 100 |
| Cocoa butter | 11.70 | 11.70 |
| Sugar | 29.50 | 29.50 |
| Skimmed milk | 3.00 | 3.00 |
| Lecithin | 0.2 | 0.2 |
| Vanillin | 0.035 | 0.035 |
| (−)-matairesinol (Compound 1-(−)), 10% in ethanol | — | 0.05 |
| (−)-hydoxymatairesinol (Compound 2-(−)), 10% in ethanol | 0.05 | — |

Example of Use 15

Chewing Gum

| Part | Substance contained | Use in % by weight |
| --- | --- | --- |
| A | Chewing gum base, "Jagum T" | 30.00 |
| B | Sorbitol, pulverised | 39.00 |
|   | Isomalt ® (Palatinit GmbH) | 9.50 |
|   | Xylitol | 2.00 |
|   | Mannitol | 3.00 |
|   | Aspartame ® | 0.10 |
|   | Acesulfame ® K | 0.10 |
|   | Emulgum ® (Colloides Naturels, Inc.) | 0.30 |
| C | Sorbitol, 70% | 14.00 |
|   | Glycerin | 1.00 |
| D | Aroma substance, containing 1% (−)-hyroxymatairesinol (Compound 2), relative to the total weight of the aroma substance | 1.00 |

Parts A to D were mixed and intensively kneaded. The raw mass can be processed, for example, as chewing gum ready for consumption in the form of thin strips.

Example of Use 16

Toothpaste

| Part | Substance contained | Use in % by weight |
| --- | --- | --- |
| A | Demineralised water | 22.00 |
|   | Sorbitol (70%) | 45.00 |
|   | Solbrol ® M, sodium salt (Bayer AG, p-hydroxybenzoic acid alkyl ester) | 0.15 |
|   | Trisodium phosphate | 0.10 |
|   | Saccharin, 450-times | 0.20 |
|   | Sodium monofluorophosphate | 1.12 |
|   | Polyethylene glycol 1500 | 5.00 |
| B | Sident 9 (abrasive silicon dioxide) | 10.00 |
|   | Sident 22 S (thickening silicon dioxide) | 8.00 |
|   | Sodium carboxymethyl cellulose | 0.90 |
|   | Titanium dioxide | 0.50 |
| C | Demineralised water | 4.53 |
|   | Sodium lauryl sulphate | 1.50 |
| D | Aroma substance, containing 1% (−)-matairesinol (Compound 1-(−)), relative to the total weight of the aroma substance | 1.00 |

The substances contained in parts A and B were each individually pre-mixed and stirred together thoroughly under vacuum at 25-30° C. for 30 min. Part C was pre-mixed and added to A and B; D was added and the mixture was stirred thoroughly under vacuum at 25-30° C. for 30 min. Following relaxation, the toothpaste was ready to be packaged.

The invention claimed is:

1. A method for masking a bitter, an astringent, and/or a metallic taste of caffeine, theobromine, naringin, quinine hydrochloride dihydrate and/or salicin comprising combining the caffeine, theobromine, naringin, quinine hydrochloride dihydrate and/or salicin with one or more vanillyl lignans selected from the group consisting of:
    (1-(−)) (−)-Matairesinol ((3R,4R)-3,4-bis[(4-hydroxy-3-methoxyphenyl)methyl]oxolan-2-one);
    (2-(−)) (−)-7-hydroxymatairesinol ((3R,4R)-4-[(S)-hydroxy-(4-hydroxy-3-methoxy-phenyl)methyl]-3-[(4-hydroxy-3-methoxyphenyl)methyl]oxolan-2-one);
    (3-(+)) (+)-lariciresinol (4-[[(3R,4R,5S)-5-(4-hydroxy-3-methoxyphenyl)-4-(hydroxy-methyl)-oxolan-3-yl]methyl]-2-methoxyphenol);
    (4-(−)) (−)-arctigenin ((3R,4R)-4-[(3,4-dimethoxyphenyl)methyl]-3-[(4-hydroxy-3-methoxy-phenyl)m-ethyl[oxolan-2-one);
    (5-(+)) (+)-isolariciresinol (1,2,3,4-tetrahydro-7-hydroxy-1-(4-hydroxy-3-methoxy-phenyl)-6-methoxy-2,-3-naphthalenedimethanol);
    (6-(−)) (−)-.alpha.-conidendrin ((3aR,9R,9aS)-7-hydroxy-9-(4-hydroxy-3-methoxyphenyl)-6-methoxy-3a,4,9,9a-tetrahydro-1H-benzo[f][2]benzofuran-3-one);
    (7-(−)) (−)-nortrachelogenin ((3S,4S)-3-hydroxy-3,4-bis[(4-hydroxy-3-methoxyphenyl)methyl]-oxolan-2-one); and
    (8-(+)) (+)-pinoresinol (4-[(3S,3aR,6S,6aR)-6-(4-hydroxy-3-methoxyphenyl)-1,3,3a,4,6,6a-hexahydrofuro[3,4-c]furan-3-yl]-2-methoxyphenol),
    wherein the stereoisomer purity is greater than 50% relative to all the stereoisomers of the respective vanillyl lignin(s).

2. The method of claim 1, wherein the stereoisomer purity is greater than 80% relative to all the stereoisomers of the respective vanillyl lignin(s).

3. The method of claim 1, wherein the total quantity of vanillyl lignans is in the range of 10 mg/kg to less than 300 mg/kg.

4. The method of claim 1, wherein the total quantity of vanillyl lignans is in the range of 12 mg/kg to 100 mg/kg.

5. The method of claim 1 for masking a bitter, an astringent, and/or a metallic taste of caffeine.

6. The method of claim 1 for masking a bitter, an astringent, and/or a metallic taste of theobromine.

7. The method of claim 1 for masking a bitter, an astringent, and/or a metallic taste of naringin.

8. The method of claim 1 for masking a bitter, an astringent, and/or metallic taste of quinine hydrochloride dehydrate.

9. The method of claim 1 for masking a bitter, an astringent, and/or metallic taste of salicin.

10. A preparation comprising caffeine, theobromine, naringin, quinine hydrochloride dihydrate and/or salicin and one or more vanillyl lignans selected from the group consisting of:
    (1-(−)) (−)-Matairesinol ((3R,4R)-3,4-bis[(4-hydroxy-3-methoxyphenyl)methyl]oxolan-2-one);
    (2-(−)) (−)-7-hydroxymatairesinol ((3R,4R)-4-[(S)-hydroxy-(4-hydroxy-3-methoxy-phenyl)methyl]-3-[(4-hydroxy-3-methoxyphenyl)methyl]oxolan-2-one);
    (3-(+)) (+)-lariciresinol (4-[[(3R,4R,5S)-5-(4-hydroxy-3-methoxyphenyl)-4-(hydroxy-methyl)-oxolan-3-yl]methyl]-2-methoxyphenol);
    (4-(−)) (−)-arctigenin ((3R,4R)-4-[(3,4-dimethoxyphenyl)methyl]-3-[(4-hydroxy-3-methoxy-phenyl)m-ethyl[oxolan-2-one);
    (5-(+)) (+)-isolariciresinol (1,2,3,4-tetrahydro-7-hydroxy-1-(4-hydroxy-3-methoxy-phenyl)-6-methoxy-2,-3-naphthalenedimethanol);
    (6-(−)) (−)-.alpha.-conidendrin ((3aR,9R,9aS)-7-hydroxy-9-(4-hydroxy-3-methoxyphenyl)-6-methoxy-3a,4,9,9a-tetrahydro-1H-benzo[f][2]benzofuran-3-one);
    (7-(−)) (−)-nortrachelogenin ((3S,4S)-3-hydroxy-3,4-bis[(4-hydroxy-3-methoxyphenyl)methyl]-oxolan-2-one); and
    (8-(+)) (+)-pinoresinol (4-[(3S,3aR,6S,6aR)-6-(4-hydroxy-3-methoxyphenyl)-1,3,3a,4,6,6a-hexahydrofuro[3,4-c]furan-3-yl]-2-methoxyphenol), wherein the stereoisomer purity is greater than 50% relative to all the stereoisomers of the respective vanillyl lignin(s).

11. The preparation of claim 10, wherein the stereoisomer purity is greater than 80% relative to all the stereoisomers of the respective vanillyl lignin(s).

12. The preparation of claim 10, wherein the total quantity of vanillyl lignans is in the range of 10 mg/kg to less than 300 mg/kg.

13. The preparation of claim 10, wherein the total quantity of vanillyl lignans is in the range of 12 mg/kg to 100 mg/kg.

14. The preparation of claim 10 comprising caffeine.

15. The preparation of claim 10 comprising theobromine.

16. The preparation of claim 10 comprising naringin.

17. The preparation of claim 10 comprising quinine hydrochloride dehydrate.

18. The preparation of claim 10 comprising salicin.

19. The preparation of claim 10 comprising:
at least 0.05% by weight of caffeine;
at least 0.05% by weight of theobromine; or
at least 0.05% by weight of naringin.

20. The preparation of claim 10 comprising:
1% to 2.5% by weight of caffeine;
1% to 2.5% by weight of theobromine; or
0.2% to 2% by weight of naringin.

\* \* \* \* \*